(12) United States Patent
Labuszewski et al.

(10) Patent No.: US 9,317,885 B2
(45) Date of Patent: Apr. 19, 2016

(54) FACILITATION OF PAYMENTS BETWEEN COUNTERPARTIES BY A CENTRAL COUNTERPARTY

(71) Applicant: Chicago Mercantile Exchange Inc., Chicago, IL (US)

(72) Inventors: John Labuszewski, Westmont, IL (US); John Nyhoff, Darien, IL (US); David Boberski, Westport, CT (US); Mike Kamradt, Chicago, IL (US); Roberta Paffaro, Sao Paulo (BR); Edward Gogol, Chicago, IL (US); John Wiley, New York, NY (US); Richard Co, Chicago, IL (US); Steve Youngren, Elgin, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 14/573,509

(22) Filed: Dec. 17, 2014

(65) Prior Publication Data
US 2015/0106254 A1 Apr. 16, 2015

Related U.S. Application Data

(63) Continuation-in-part of application No. 13/162,821, filed on Jun. 17, 2011.

(51) Int. Cl.
*G06Q 40/04* (2012.01)
*G06Q 20/10* (2012.01)
*G06Q 40/00* (2012.01)

(52) U.S. Cl.
CPC ............... *G06Q 40/04* (2013.01); *G06Q 20/10* (2013.01); *G06Q 40/00* (2013.01)

(58) Field of Classification Search
CPC .............................. G06Q 40/04; G06Q 40/06
See application file for complete search history.

(56) References Cited

U.S. PATENT DOCUMENTS

| 7,376,614 B1* | 5/2008 | Scheinberg | G06Q 40/025 705/37 |
|---|---|---|---|
| 2005/0216387 A1* | 9/2005 | Barany et al. | 705/35 |
| 2007/0118453 A1 | 5/2007 | Bauerschmidt et al. | |
| 2007/0239589 A1 | 10/2007 | Wilson et al. | |
| 2008/0120144 A1* | 5/2008 | Bartell et al. | 705/4 |

(Continued)

OTHER PUBLICATIONS

David Boberski, "Zero Coupon Interest Rate Swap Futures Overview", CME Group, Jun. 2009, 2 pages.

(Continued)

*Primary Examiner* — Robert R Niquette
*Assistant Examiner* — Liz P Nguyen
(74) *Attorney, Agent, or Firm* — Lempia Summerfield Katz LLC

(57) ABSTRACT

A system for moving money between accounts of traders by a central counterparty to facilitate payments, i.e. the movement of funds, there between is disclosed which provides a flexible mechanism which supports simpler accounting, new types of derivatives contracts as well new types fees. The disclosed futures contract, referred to as a "payer" contract, comprises a "no-uncertainty" futures contract, i.e. the initial value and settlement value parameters are defined, that leverages the mechanisms of the clearing system to, for example, accommodate related payments. Accordingly, a 1-to-many relationship between contracts and prices is provided whereby each price component may be assigned its own payer contract. The function of the payer contract may be to guarantee the movement of money from related positions. In one embodiment, payer contracts are dynamically created whenever a payment is needed.

23 Claims, 4 Drawing Sheets

(56) References Cited

U.S. PATENT DOCUMENTS

| | | | | |
|---|---|---|---|---|
| 2009/0177571 A1* | 7/2009 | Gogol | ............... | G06Q 20/042 705/35 |
| 2009/0313162 A1 | 12/2009 | Flory et al. | | |
| 2010/0094744 A1* | 4/2010 | Van Slyke | ............. | G06Q 40/04 705/37 |

OTHER PUBLICATIONS

International Preliminary Report on Patentability in PCT/US2012/039246, dated Dec. 17, 2013, 12 pages.

International Search Report and Written Opinion in PCT/US2012/039246, dated Aug. 3, 2012, 13 pages.

* cited by examiner

FACILITATION OF PAYMENTS BETWEEN COUNTERPARTIES BY A CENTRAL COUNTERPARTY

REFERENCE TO RELATED APPLICATIONS

This application is a continuation-in-part under 37 C.F.R. §1.53(b) of U.S. patent application Ser. No. 13/162,821 filed Jun. 17, 2011, the entirety of which is hereby incorporated by reference.

BACKGROUND

Futures Exchanges, referred to herein also as an "Exchange", such as the Chicago Mercantile Exchange Inc. (CME), provide a marketplace where futures and options on futures are traded. Futures is a term used to designate all contracts covering the purchase and sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. Each futures contract is standardized and specifies commodity, quality, quantity, delivery date and settlement. Cash Settlement is a method of settling a futures contracts by cash rather than by physical delivery of the underlying asset whereby the parties settle by paying/receiving the loss/gain related to the contract in cash when the contract expires.

Typically, the Exchange provides a "clearing house" which is a division of the Exchange through which all trades made must be confirmed, matched and settled each day until offset or delivered. The clearing house is an adjunct to the Exchange responsible for settling trading accounts, clearing trades, collecting and maintaining performance bond funds, regulating delivery and reporting trading data. Essentially mitigating credit. Clearing is the procedure through which the Clearing House becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House. In the case of the CME's clearing house, all clearing members not specifically designated as Class B members are considered Class A clearing members. In the CME there are three categories of clearing members: 1) CME clearing members, qualified to clear transactions for all commodities; 2) IMM clearing members, qualified to clear trades for only IMM and TOM commodities; and 3) IMM Class B clearing members, solely limited to conducting proprietary arbitrage in foreign currencies between a single Exchange-approved bank and the IMM and who must be guaranteed by one or more Class A non-bank CME or IMM clearing member(s). Note that a "member" is a broker/trader registered with the Exchange.

As an intermediary, the Exchange bears a certain amount of risk in each transaction that takes place. To that end, risk management mechanisms protect the Exchange via the Clearing House. The Clearing House establishes clearing level performance bonds (margins) for all Exchange products and establishes minimum performance bond requirements for customers of Exchange products. A performance bond, also referred to as a margin, is the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The accounts of individual members, clearing firms and non-member customers doing business through the Exchange must be carried and guaranteed to the Clearing House by a clearing member. As mentioned above, in every matched transaction executed through the Exchange's facilities, the Clearing House is substituted as the buyer to the seller and the seller to the buyer, with a clearing member assuming the opposite side of each transaction. The Clearing House is an operating division of the Exchange, and all rights, obligations and/or liabilities of the Clearing House are rights, obligations and/or liabilities of the Exchange. Clearing members assume full financial and performance responsibility for all transactions executed through them and all positions they carry. The Clearing House, dealing exclusively with clearing members, holds each clearing member accountable for every position it carries regardless of whether the position is being carried for the account of an individual member, for the account of a non-member customer, or for the clearing member's own account. Conversely, as the contra-side to every position, the Clearing House is held accountable to the clearing members for the net settlement from all transactions on which it has been substituted as provided in the Rules.

DETAILED DESCRIPTION OF THE DRAWINGS AND PRESENTLY PREFERRED EMBODIMENTS

Figure 1:
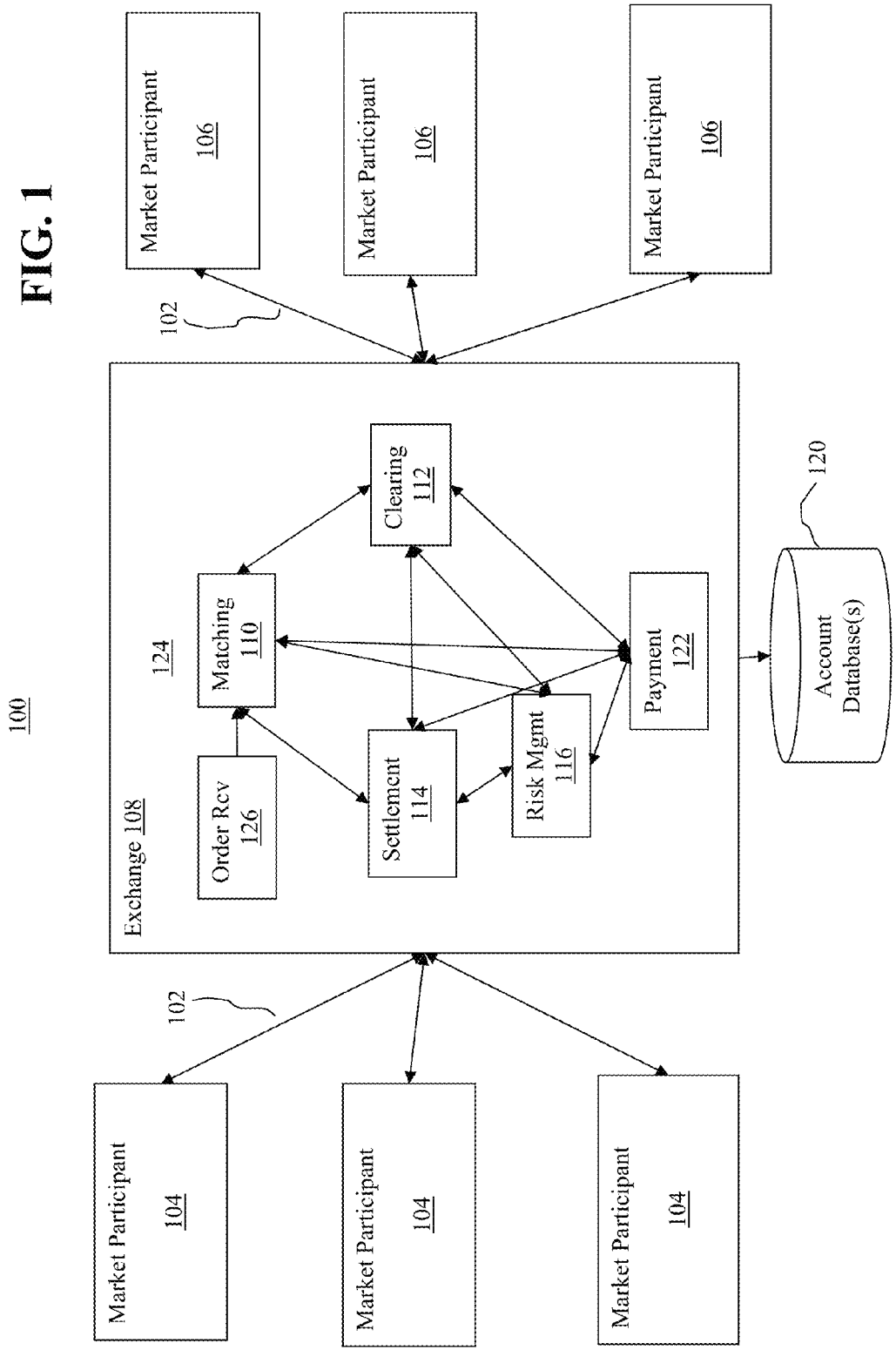
FIG. 1 shows a block diagram of an exemplary network for trading futures contracts, including in which payer contracts may be implemented, according to one embodiment.

A system for moving money between accounts of traders by a central counterparty to facilitate payments, i.e. the movement of funds, there between is disclosed which provides a flexible mechanism which supports simpler accounting, new types of derivatives contracts as well as new types of fees. As was discussed above, in futures contract clearing, a margin account offsets losses or gains related to the price change of a contract. If a trader's contract price increases or decreases, the change in value is reflected in the margin account. In fact, generally the only way to move money in or out of a margin account is by changing the price of the futures contract. This is a one-to-one relationship: one contract, one cash flow. Current systems, however, cannot handle related cash flows like coupons, interest on variation margin, or other periodic or occasional payments made by one trader to another while the related position remains open, e.g. a one-to-many relationship: one contract, two or more cash flows. In the over-the-counter ("OTC") market, for example, if a trader's position decreases, the trader must make a cash payment (collateral) to the prime broker account of the counterparty. An important distinction in OTC markets is that any collateral in the prime broker account of a counterparty remains the property of the trader, and thus the trader is entitled to at least one additional margin account cash flow, which is interest on the collateral. Current futures contract clearing systems do not support this type of payment requiring separate/external ad hoc payment and accounting mechanisms to manage.

Exchange derivative contracts having a periodic or sporadic payment from one party to the contract to the other; or, a payment between the exchange and a party to a derivatives contract, have been proposed. However, a problem with such payments is that exchange clearing systems must be coordinated with adjacent non-exchange owned and operated bookkeeping services and systems to account for and manage these related payments. So even if the exchange were to configure its systems accordingly to accommodate such periodic or other related payments, difficulties are often experienced in coordinating these capabilities with the (many) bookkeeping service providers or the (many) proprietary bookkeeping systems, such as "front-end" independent software vendors ("ISV's") and "back-end" bookkeeping services that interact with the Exchange. Thus, acceptance of novel contracts that utilize such periodic payments may be impeded.

The disclosed futures contract, referred to as a "payer" contract, comprises a "no-uncertainty" futures contract, i.e. the initial value and settlement value parameters are defined and/or pre-determined and, thereby, the buyer and seller are not exposed to market risk. The disclosed payer contract leverages the mechanisms of the clearing system to accommodate, for example, a related, e.g. life cycle, payment featured by a traditional contract to which it may be paired. Accordingly, a 1-to-many relationship between contracts and prices is provided whereby each price component may be assigned its own payer contract. The function of the payer contract is to guarantee, by creating a defined and riskless position value and settlement value, the movement of money from related positions. In one embodiment, payer contracts are dynamically created whenever a payment is needed in relation to some other position held by the parties, though they may be manually created in such situations as well. In addition, the traders among which the payment is to be transferred need not know of each other, the disclosed mechanism, and the central counterparty underpinnings, facilitating anonymous payments there between.

The disclosed embodiments have application with respect to a potentially wide variety of exchange traded, multi-laterally cleared derivatives contracts and have the advantage of being "implementable" by an Exchange without explicit coordination with adjacent non-exchange owned and operated bookkeeping service providers. In particular, any contract structure that contemplates a "pass-through" of monetary value for the purposes of creating a pseudo coupon payment, dividend payment, fee payment, swap payment, rolling spot interest pass-through payment, etc. may use the disclosed embodiments to effect payment.

Derivative contracts, such as those traded or cleared at CME Group, have become increasingly complex in recent years. In particular, the demand to replicate the operational requirements of over-the-counter (OTC) derivatives with their emphasis on customization has proven to be challenging. The disclosed payer contract may address these issues and difficulties.

For example, consider a contract that replicates an interest rate swap ("IRS") which, typically, contemplates periodic swaps of cash calculated by reference to a fixed and a floating interest rate. It will be appreciated that such occasional payments are not a standard feature of futures contracts and are not simply a function of the daily mark-to-market ("MTM") of a futures contract by reference to the daily settlement price. Rather, standard futures contracts contemplate a single "reckoning" upon a single final settlement date.

A payer contract may be generated by an Exchange, such as CME Group, so as to flow seamlessly into adjacent private systems, including back-end bookkeeping service systems, obviating the necessity for the bookkeeping service to build out new capabilities. That is, while the Exchange, and/or Clearing House thereof, may still need to build the capability of generating payer contracts, such as on an automated basis, when these auto-generated contracts are created, they may flow into accounts that are kept in adjacent bookkeeping systems easily.

In one embodiment a payer contract may be valued on a "binary basis", referred to as a "binary option," at either $0 or $1, at the discretion of the Exchange. The "switch" may be set by the Exchange in the same way that a cash-settled futures contract is valued at a particular value on its final settlement date. Thus, an account holding a long payer contract may receive either $0 or $1 on the final settlement date of the contract. An account holding a short payer contract may receive either $0 or be obligated to pay $1 on the final settlement date of the contract.

It will be understood that a margin account offsets gains or losses related to the price change of a futures contract held by a trader. If a trader holds a "long" position (obligated to buy) on a contract for which the price increases or holds a "short" position (obligated to sell) on a contract for which the price decreases, the trader's risk of loss goes down and their margin requirement will go down which may result in funds being credited to their margin account by the clearing and margin mechanisms of the Exchange, the crediting occurring substantially simultaneously with a debiting of similar magnitude from the margin account of the trader holding the counter position. That is, for the trader holding a long position on a contract for which the price decreases or holding a short position on a contract for which the price increases, the trader's risk of loss goes up and their margin requirement will go up which may result in funds being debited from their margin account. The clearing organization of the central counter party automatically determines the daily contract settlement prices and corresponding margin requirements for the traders and automatically moves the funds as appropriate to ensure performance by the parties. In the case of a cash-settled contract, at the settlement date, the buyer and the seller may simply exchange the difference in the associated cash positions. The cash position is the difference between the spot price of the asset on the settlement date and the agreed upon price as dictated by the future contract. If the spot price is less than the contract price, the buyer pays the seller the difference. If the spot price is more than the contract price, the seller pays the buyer the difference. This cash settlement may be effected via the margin accounts of the traders as described above.

By generating payer contracts on an automated basis in particular accounts held at the Clearing House, funds may effectively be moved from one party, the "payor", to the other party, the "payee", of contracts booked on the Exchange. That is, in the case of binary payer contracts, by assigning a quantity of contracts based on the payment amount, which may be determined at, or prior to, settlement, the appropriate amount may be paid by the payor to the payee. Given the operation of the margining systems of the Exchange, this may be accomplished by valuing the position in the contracts at a zero value and then setting a non-zero value, e.g. $1 per contract, at settlement, thereby creating an increase in contract value and a gain for the long position and loss for the short position, the margining mechanisms of the Exchange automatically, or naturally, moving the appropriate funds from the account of the short trader to the account of the long trader. Conversely, the position in the contracts may be initially valued at a non-zero amount, e.g. $1, and then settled at a value of zero, thereby creating a decrease in the contract value and a loss for long position and a gain for the short position, the margining mechanisms of the Exchange automatically, or naturally, moving the appropriate funds from the account of the long trader to the account of the short trader. In either case, the initial contract value and settlement value, and assignment of corresponding long and short positions to the payor and payee, are implementation dependent. The utility of the disclosed payer contracts may be extended and applied in many other ways as described below.

It will be appreciated that construction of a payer contract as a "binary option" valued at either $0 or $1 at expiration may imply certain limitations. Consider that some systems of the Exchange or adjacent front-end or back-end systems may be limited in terms of the field size reserved in their record keeping systems or databases for quantity of futures contracts traded or held. For example, if a system is constructed to reserve 4 decimal digits, or the binary equivalent thereof, for the quantity field, the maximum number of futures contracts may be limited to 9,999. Or, if the quantity field is limited to 5 digits, the maximum quantity may be 99,999. This may be problematic if the value to be transferred is greater than $1 times that maximum quantity.

Thus, in an alternate embodiment, an "analog" payer contract may be defined instead of, or in addition to, the binary payer contract. It will be recognized that the binary payer contract is a variant of the analog payer contract in which case it need not be specifically defined. Analog payer contracts may be valued on an analog scale akin to a standard index futures contract, having a quantity, which may be greater than or equal to 1, and price associated therewith. Thus, they may be cash-settled at, for example, a multiplier $X, e.g. a pseudo quantity, multiplied by an arbitrary value or Final Settlement Price that may range from infinity ($\infty$) to negative infinity ($-\infty$). Alternatively, the multiplier may be altered, e.g. instead of establishing the multiplier at $1, it may be at $0.01, $10, $100, $1,000, $10,000, $100,000 as appropriate for the specific application. The multiplier and final settlement price may be determined based on the amount of the payment to be made and, for example, the respective record keeping fields sizes, i.e. such that the magnitude of the respective multiplier/quantity and settlement price values can be handled by the record keeping systems, e.g. to avoid overflow, and still be used to handle the expected payment amounts. It will be further appreciated that the balancing of the magnitude of the multiplier versus the magnitude of the price may vary but still achieve the same payment amount and, therefore, may be based on other factors such as the convenience of the traders in viewing, reporting and comprehending the values, etc.

For example, an analog payer contract having an initial value of zero, may be valued at $1×Final Settlement Price at settlement. The Final Settlement Price may be established at 10,000. Thus, the analog payer contract is valued at $10,000 (=$1×10,000.00). The account holding a single long position (quantity=1) in the analog payer contract may receive $10,000 while the account holding a single short position pays $10,000.

Payer contracts may have many applications, such as in the context of exchange cleared interest rate swaps ("IRS") where these contracts may be used to move the "price alignment interest" ("PAI"). For example, the buyer of an IRS may be required to pay the seller a value calculated by reference to a fixed rate of interest on a periodic basis for the life of the transaction. The seller of an IRS may be required to pay the buyer a value calculated by reference to a floating or dynamic rate of interest on a periodic basis for the life of the transaction. Typically, these payments are "netted" so that gross values are not transferred but only net values. Payer contracts may be utilized to provide for such transfers of value.

Payer contracts may also be: linked with interest rate derivatives contracts for purposes of making what may essentially be regarded as coupon payments from one party of the trade to the other; linked with equity based derivatives contracts for purposes of making what may essentially be regarded as dividend payments from one party of the trade to the other; and/or used to implement rolling spot contracts which are established from time to time in the context of FX markets and are designed to price in manner similar to the spot value of a currency by requiring a, typically, daily payment that reflects the interest rate differential between the two currencies.

Alternatively, or in addition thereto, payer contracts may be used to implement fee payments, such as transaction fees. The typical exchange fee model is based on volume or turnover, i.e., when a trade is consummated, both buyer and seller pay a pre-determined exchange fee. However, futures contracts do not typically contemplate fees based on the value or notional value of the underlying instrument, which may be considered in a manner similar to a management fee typically associated with fund investments. While there have been some attempts to collect what may be regarded as a form of management or holding fee in the context of CME TRAKRS, i.e. non-traditional futures contracts designed to provide customers with a cost-effective way to invest in a broad-based index of stocks, bonds, currencies or other financial instruments avoiding, for example, the need for a portfolio manager and potential adverse tax consequences, and some over-the-counter commodity indexes listed on CME Group facilities, these products and this fee system required complex programming and coordination with back-end bookkeeping services. Payer contracts may be created to pay these fees from an account to the account of the Exchange or possibly to other accounts held by those with rights in a particular contract or other arrangements to share in fees.

The disclosed payer contracts may be created with various nomenclature designations, e.g., coupons, dividends, rolling spot payments, swap payment, fee, etc. By attaching such nomenclature to these contracts, akin to the way that the term "E-mini S&P 500 futures" may be associated in clearing and bookkeeping systems with the ticker symbol "ES," the purpose of such payer contract may be made transparent to those examining an account statement. Likewise, payer contracts with different underlying purposes may be constructed with different contract terms and conditions as deemed most conducive to the purpose.

While the disclosed embodiments will be described in reference to the CME, it will be appreciated that these embodiments are applicable to any Exchange, including those which trade in equities and other securities. The CME Clearing House clears, settles and guarantees all matched transactions in CME contracts occurring through its facilities. In addition, the CME Clearing House establishes and monitors financial requirements for clearing members and conveys certain clearing privileges in conjunction with the relevant exchange markets.

Referring now to FIG. 1, there is shown a block diagram of an exemplary network 100 for trading futures contracts, including in which payer contracts may be implemented, according to the disclosed embodiments. The network 100 couples market participants 104, 106, such as those entities 104 wishing or needing to make a payment, also referred to as payors, and those entities 106 to which the payment is to be made, also referred to as payees, with an exchange 108, such as the CME, also referred to as a central counterparty or intermediary, via a communications network 102, such as the Internet, an intranet or other public or private, secured or unsecured communications network or combinations thereof. The network 100 may also be part of, or alternatively coupled with a larger trading network, allowing market participants 104 106 to trade other products, such as futures contracts, options contracts, foreign exchange instruments, etc., via the exchange 108, including derivatives contracts featuring periodic or occasional payments prior to settlement. It will be appreciated that the plurality of entities utilizing the disclosed embodiments, e.g. the market participants 104, 106, may be referred to as payors, payees, lenders, borrowers, traders, market makers or by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant 104 106 and/or the exchange 108.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange 108 implements the functions of matching 110 buy/sell transactions, clearing 112 those transactions, settling 114 those transactions and managing risk 116 among the market participants 104 106 and between the market participants and the exchange 108, as well as payment functionality 122 for administering payments between payors and payees as will be described. The exchange 108 may be include or be coupled with one or more database(s) 120 or other record keeping system which stores data related to open, i.e. un-matched, orders, matched orders which have not yet been delivered, as well as payments made or owing, or combinations thereof.

Typically, the exchange 108 provides a "clearing house" (not shown) which is a division of the Exchange 108 through which all trades made must be confirmed, matched and settled each day until offset or delivered. The clearing house is an adjunct to the Exchange 108 responsible for settling trading accounts, clearing trades, collecting and maintaining performance bond funds, regulating delivery and reporting trading data. Essentially mitigating credit. Clearing is the procedure through which the Clearing House becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House.

In the presently disclosed embodiments, the Exchange 108 assumes an additional role as the central counterparty in payment transactions, i.e., the Exchange 108, via the margin mechanisms, will become the payee to each payor and payor to each payee, and assume responsibility for protecting payees and payors from financial loss by assuring performance on each payment contract, as is done in normal futures transactions. Additionally, the Exchange 108 may further assume the role as administrator of products, i.e. derivatives contracts, which require payments, computing when a payment is due, computing the amount of the payment and automatically generating the payer contracts to effect the payment by the due date. As used herein, the term "Exchange" 108 will refer to the centralized clearing and settlement mechanisms, risk management systems, etc., as described below, used for futures trading, including the described enhancements to facilitate payment transactions. By assuming this intermediary role and employing credit screening and risk management mechanisms, derivatives contracts having periodic or occasional payments may be implemented for parties desiring such contracts. Further, additional revenue sources for the Exchange may be facilitated, such as account maintenance fees on accounts holding open futures positions.

Referring back to FIG. 1, a system 124 for facilitating a payment between a first trader 104 and a second trader 106 by a central counterparty 108 which requires the first and second traders 104 106 to each maintain associated accounts in which funds are deposited to cover trading losses. The system includes an account database 120 stored in a memory 404 discussed below with reference to FIG. 4, the account database 120 comprising a first account record associated with the first trader 104 which includes data reflecting funds maintained on account to cover trading losses by the first trader 104, and a second account record associated with the second trader 106 which includes data reflecting funds maintained on account to cover trading losses by the second trader 106.

The system 124 further includes a payment processor 122 coupled with the database 120, or memory 404 storing it, and operative to determine the amount of a payment to be made from one of the first or second trader 104 106 to the other of the first or second trader 104 106 at a settlement date, wherein the payment processor 122 is further operative to assign the first trader 104 a first position in a futures contract characterized by the settlement date, a quantity and a price, the first position being characterized by a value based on the quantity and the price of the futures contract as of the assignment, and assign the second trader 106 a second position, counter to the first position, in the futures contract, the first and second traders not being identified to each other. In one embodiment, the payment processor 122 is operative to determine the payment amount upon occurrence of the settlement date. Alternatively, the payment amount is determined in advance of the settlement date.

The system 124 further includes a settlement processor 114 coupled with the database 120, or memory 404 storing it, and operative to value, upon occurrence of the settlement date, the futures contract at a spot value different from the price of the futures contract, the difference being based on the determined payment amount.

In addition, the system 123 includes a margin processor 116 coupled with the settlement processor 114 and the database 120, or memory 404, and operative to modify the first and second account records in the account database to reflect a credit to the account of the first trader 104 and a debit from the account of the second trader 106 in the amount of the difference between the value of the first position and the spot value when the difference represents a loss for the second trader 106, and modify the first and second account records in the account database to reflect a debit from the account of the first trader 104 and a credit to the account of the second trader 106 in the amount of the difference between the value of the first position and the spot value when the difference represents a loss for the first trader 104.

In one embodiment, the payment processor 122 may be further operative to automatically assign the first and second positions to the first and second traders 104 106 based on a second position in a second instrument held by the first trader 104 to which the second trader 106 is a counterparty. For example, the second instrument may include a interest rate derivative, the payment comprising a coupon payment, the second instrument may include an equity based derivatives contract, the payment comprising a dividend payment, the second instrument may include a foreign exchange spot contract, the payment comprising an interest rate differential payment, the second instrument may include interest rate swap, the payment comprising an interest payment, the second instrument may include a loan of collateral, the payment comprising an interest payment, the payment may include a transaction fee, or combinations thereof.

In one embodiment, the quantity of futures contract may be 1, the payment processor 122 being further operative to assign the first and second positions in a plurality of the futures contract, the quantity of the plurality of the futures contract being determined based on the payment amount. For example, the value of the first and second positions as of the assignment may be zero wherein the spot value is non-zero. Alternatively, the spot value may be valued based on a multiplier and a final settlement value, wherein the multiplier may be 0.01, 0.10, 1.00, 10.00, 100.00, 1000.00, 10,000.00, or some other value.

In one embodiment, the value of the first and second positions as of the assignment may be non-zero, such as based on a multiplier and a final settlement value, and wherein the spot value may be zero. The multiplier may include 0.01, 0.10, 1.00, 10.00, 100.00, 1000.00, 10,000.00, or some other value.

Figure 2:
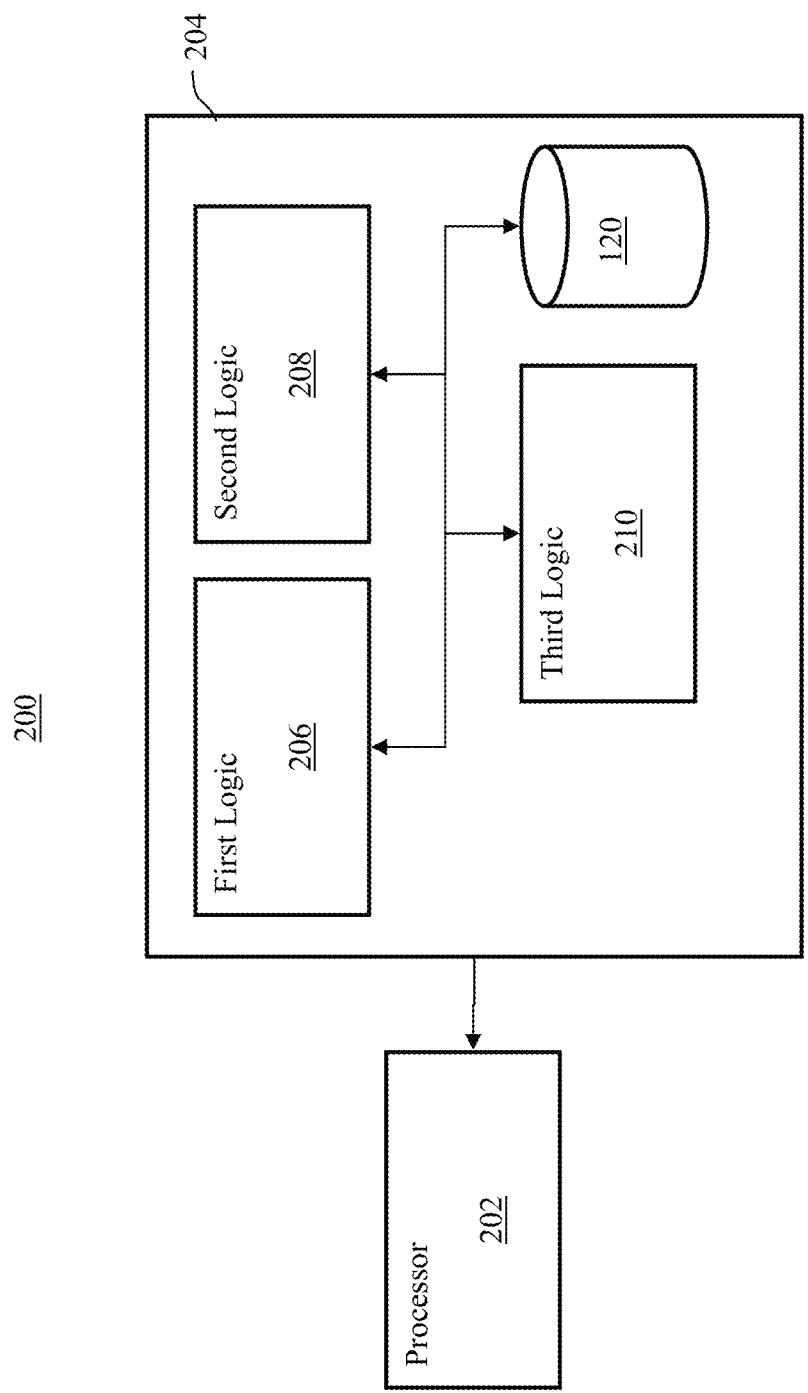
FIG. 2 a block diagram of an exemplary implementation of the system of FIG. 1 for facilitating payments between counterparties, e.g. first and second traders, by a central counterparty.
Figure 4:
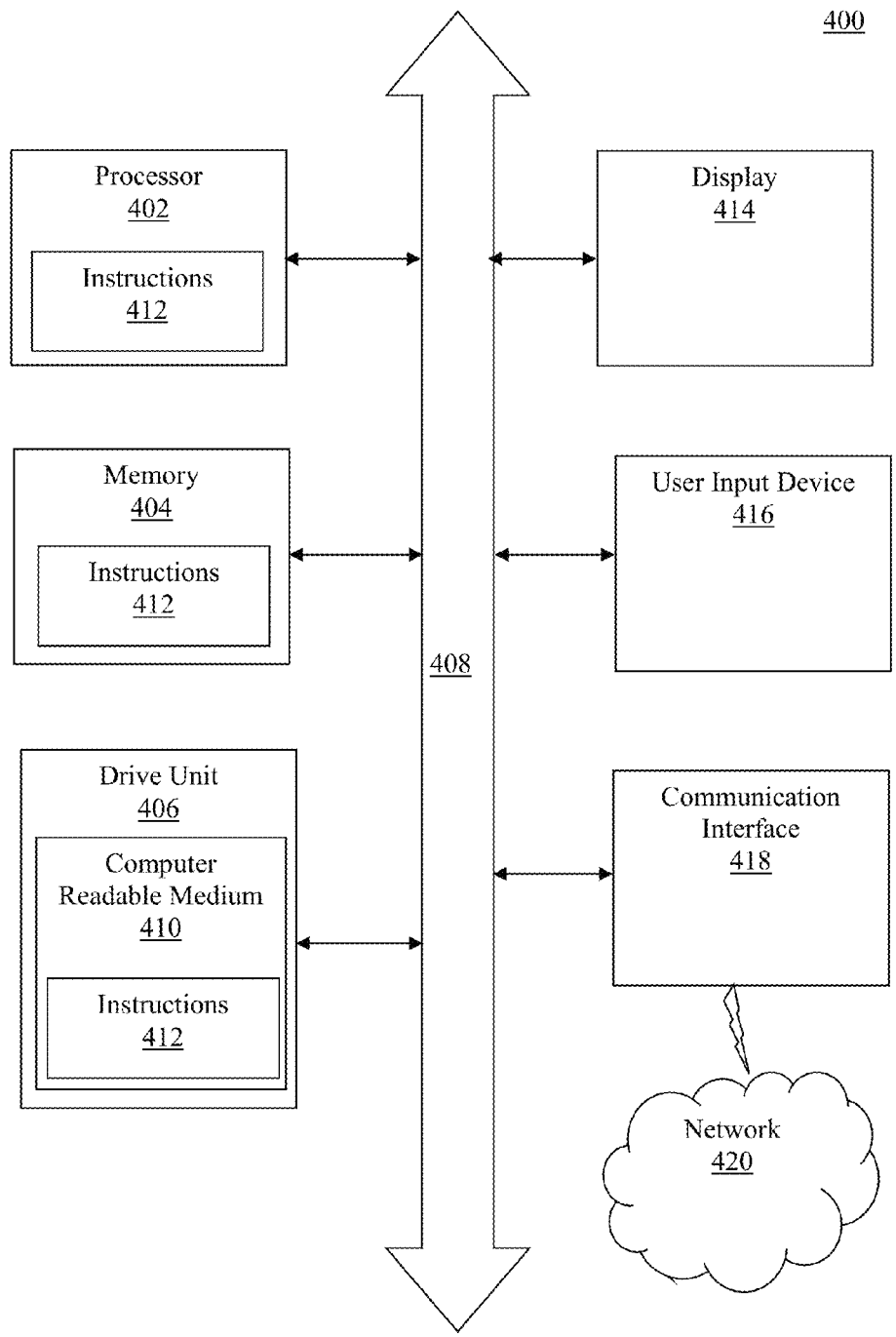
FIG. 4 shows an illustrative embodiment of a general computer system 400 for use with the system of FIG. 1.

Referring to FIG. 2, there is shown a block diagram of an exemplary implementation of the system 124 for facilitating payments between counterparties, e.g. first and second traders, by a central counterparty which requires the first and second traders to each maintain associated accounts in which funds are deposited to cover trading losses, the central counterparty comprising a processor 202 and a memory 204 coupled therewith, such as the processor 402 and memory 404 shown in FIG. 4 and described in more detail below. The system 124 includes an account database 120 stored in the memory 204, the account database 120 comprising a first account record associated with the first trader 104 which includes data reflecting funds maintained on account to cover trading losses by the first trader 104, and a second account record associated with the second trader 106 which includes data reflecting funds maintained on account to cover trading losses by the second trader 106. The system 124 further includes first logic 206 stored in the memory 204 and executable by processor 202 to determine the amount of a payment to be made from one of the first or second trader 104 106 to the other of the first or second trader 104 106 at a settlement date, i.e. the payment amount is determined in advance of settlement thereof and then paid on the settlement date. The first logic 206 may be further executable to assign the first trader 104 a first position in a futures contract characterized by the settlement date, a quantity and a price, the first position being characterized by a value based on the quantity and the price of the futures contract as of the assignment, and assign the second trader 106 a second position, counter to the first position, in the futures contract, the first and second traders 104 106 not being identified to each other.

The system 124 further includes second logic 208 stored in the memory 204 and executable by the processor 202 to value, upon occurrence of the settlement date, the futures contract at a spot value different from the price of the futures contract, the spot value, and thereby the difference, being based on the determined payment amount.

In addition, the system 124 includes third logic 210 stored in the memory 204 and executable by the processor 202 to modify the first and second account records in the account database to reflect a credit to the account of the first trader 104 and a debit from the account of the second trader 106 in the amount of the difference between the value of the first position and the spot value when the difference represents a loss for the second trader 106, and modify the first and second account records in the account database to reflect a debit from the account of the first trader 104 and a credit to the account of the second trader 106 in the amount of the difference between the value of the first position and the spot value when the difference represents a loss for the first trader 104.

Figure 3:
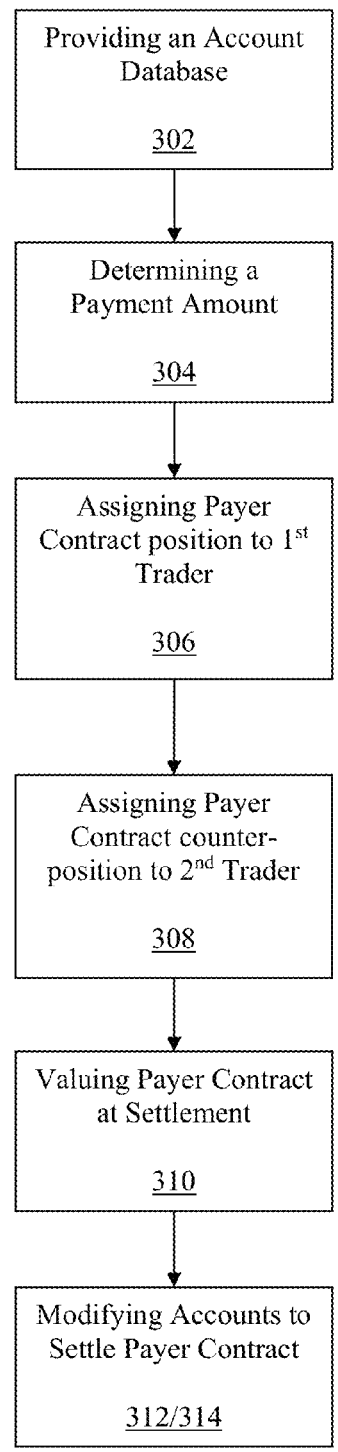
FIG. 3 depicts a flow chart showing operation of the system of FIGS. 1 and 2.

FIG. 3 depicts a flow chart showing operation of the system of FIGS. 1 and 2. In particular FIG. 3 shows a computer implemented method of facilitating a payment between a first trader and a second trader by a central counterparty which requires the first and second traders to each maintain associated accounts in which funds are deposited to cover trading losses, the central counterparty comprising a payment processor 122, a settlement processor 114, a margin processor 116, and a memory (not shown) such as the memory 404 of FIG. 4, coupled with the payment, settlement and margin processors 122 114 116. The method includes: providing, by the central counterparty, an account database stored in the memory, the account database comprising a first account record associated with the first trader which includes data reflecting funds maintained on account to cover trading losses by the first trader, and a second account record associated with the second trader which includes data reflecting funds maintained on account to cover trading losses by the second trader (block 302); determining, by the payment processor 122, the amount of a payment to be made from one of the first or second trader to the other of the first or second trader at a settlement date (block 304), such as upon occurrence of the settlement date or prior thereto, i.e. the payment amount is determined in advance of settlement thereof and then paid on the settlement date; assigning, by the payment processor 122, the first trader a first position in a futures contract characterized by the settlement date, a quantity and a price, the first position being characterized by a value based on the quantity and the price of the futures contract as of the assigning (block 306); assigning, by the payment processor 122, the second trader a second position, counter to the first position, in the futures contract, the first and second traders not being identified to each other (block 308); valuing, by the settlement processor 114 upon occurrence of the settlement date, the futures contract at a spot value different from the price of the futures contract, the spot value, and thereby by the difference, being based on the determined payment amount (block 310); modifying, by the margin processor 116, the first and second account records in the account database to reflect a credit to the account of the first trader and a debit from the account of the second trader in the amount of the difference between the value of the first position and the spot value when the difference represents a loss for the second trader (block 312); and modifying, by the margin processor 116, the first and second account records in the account database to reflect a debit from the account of the first trader and a credit to the account of the second trader in the amount of the difference between the value of the first position and the spot value when the difference represents a loss for the first trader (block 314).

In one embodiment, the assigning to the first and second traders is automatically performed by the central counter-party based on a second position in a second instrument held by the first trader to which the second trader is a counterparty. For example, the second instrument may include a interest rate derivative, the payment comprising a coupon payment, the second instrument may include an equity based derivatives contract, the payment comprising a dividend payment, the second instrument may include a foreign exchange spot contract, the payment comprising an interest rate differential payment, the second instrument may include interest rate swap, the payment comprising an interest payment, the second instrument may include a loan of collateral, the payment comprising an interest payment, the payment may include a transaction fee, or combinations thereof In one embodiment, the quantity of futures contract may be 1, the assigning of the first and second positions to the first and second traders respectively, further comprising assigning the first and second positions in a plurality of the futures contract, the quantity of the plurality of the futures contract being determined based on the payment amount.

In one embodiment, the value of the first and second positions as of the assigning may be zero and the spot value may be non-zero, such as based on a multiplier and a final settlement value. The multiplier may include 0.01, 0.10, 1.00, 10.00, 100.00, 1000.00, 10,000.00, or other value.

In one embodiment, the value of the first and second positions as of the assigning may be non-zero wherein the spot value is zero. The value of the first and second positions may be based on a multiplier and a final settlement value where the multiplier may be 0.01, 0.10, 1.00, 10.00, 100.00, 1000.00, 10,000.00 or another value.

While the disclosed embodiments were discussed above with respect to the payment of price alignment interest for Interest Rate Swap contracts, as was discussed above, the disclosed embodiments have application with respect to a potentially wide variety of exchange traded, multi-laterally cleared derivatives contracts, including new contract types not implemented previously. As discussed above, the disclosed payer contracts are cash-settled constructs that may be assigned to long and short futures accounts. They are arbitrarily assigned a cash value on a specified final settlement date and may be used to provide for the mechanical payment or pass-through of a cash amount from long to short; or, from short to long, as appropriate. Accordingly, the disclosed payer contract may be used in conjunction with appropriately structured futures contracts to more simply, accurately and efficiently mimic or otherwise simulate, using a central counter-party based data and transaction processing system, the financial and/or economic characteristics of various other financial instruments which feature periodic cash flows among the participants to the transaction.

For example, the disclosed payer contract may be used in conjunction with an appropriately structured futures contract to simulate an exchange traded fund ("ETF"), a Treasury instrument (coupon bearing fixed income or money market instrument), a Treasury Inflation Protected Security, or an Interest Rate Swap instrument. While the disclosed simulated instruments will be described with respect to being implemented using the payment mechanism, e.g. payer contract, described above, it will be appreciated that other mechanisms for facilitating the movement of the periodic cash flows may be used.

This disclosed embodiments may be used to implement: (1) Dividend Accruing Futures (DAF) Contracts; (2) Fixed Settlement/Coupon Generating Futures Contracts; (3) Inflation Protected Futures (IPFs); and (4) Futures Contracts Using Fixed vs. Floating Rate Pass-Through, as will be described. In particular, these instruments, which, as described below, may be constructed as a futures contract, all utilize a cash "pass-through" mechanism, such as the payer contract discussed above, from short to long; or, long to short, contingent upon the circumstances. Further, they all use this mechanism in an attempt to replicate the cash flows of other extant financial products.

In one embodiment, the Dividend Accruing Futures (DAFs) contract contemplates the periodic—likely quarterly—payment from shorts to longs in an amount dictated by the observed dividend accruals associated with a stock index, e.g., the Standard & Poor's 500 (S&P 500). This mimics the quarterly payment of accrued dividends to holders of Exchange Traded Funds (ETFs) such as the S&P 500 SPDRs ETF.

In one embodiment, the Fixed Settlement/Coupon Generating Futures contract contemplates a periodic payment of an amount established by reference to a fixed percentage applied to a fixed base amount such as 2% of $100,000 on an annualized basis ($2,000), or 1% of $100,000 on a semi-annual basis. This payment would flow from short to long. This mimics the structure of a Treasury security.

In one embodiment, the Inflation Protected Futures (IPF) contract likewise contemplates a periodic payment of an amount established by reference to a fixed percentage applied to a base amount. But in this case, the base amount is variable as a function of inflation. Thus, we might have a 2% annual payment or 1% semi-annually applied to $100,000 or $1,000. But if the inflation reference has risen by 1% by the next semi-annual payment date, the base amount may have risen to $101,000—and 1% of $101,000 equals $1,010. This payment would flow from short to long. This mimics the structure of a Treasury Inflation Protected Security or TIPS.

In one embodiment, the futures contract using a fixed vs. floating rate pass-through may contemplate a periodic (quarterly or semi-annual) payment of an amount established by the differential between a fixed rate such as 2% annually or 0.5% quarterly against a fixed base amount such as $100,000—or $500 quarterly. This fixed amount is matched with a floating rate established by reference to current LIBOR rates or other short-term rates applied to a fixed base amount—such as 1.2% annualized applied to $100,000 on a quarterly basis—or $300 [=(1.2%/4)×$100,000]. Balancing the $500 fixed payment with a $300 floating rate payment, we have a net payment of $200. In this case, the net payment of $200 would pass from short to long. But assume that the floating payment is 3% annualized or $750 on a quarterly basis [=(3%/4)×$100,000]. Thus, the net payment is −$250 or the $500 fixed payment vs. the $750 floating payment. This net payment of $250 would pass from long to short. This is intended to mimic the structure of a conventional or "plain vanilla" interest rate swap (IRS) instrument.

As will be appreciated, the above introduced instruments, which may be implemented as futures contracts as will be described in more detail below, mimic the structure of various other financial instruments traded per different regulatory regimes—specifically, ETFs, Treasuries, TIPS and over-the-counter (OTC) IRS instruments. Further, by utilizing futures contracts a central clearing/counter party based transaction processing system may be used which provides for risk/credit management via the novation and margin processes as well as allowing for netting and/or offsetting of positions. This may further allow the herein described contracts to be traded in combination, e.g. as a spread transaction. For example, by trading a spread between a standard futures contract and a Dividend Accruing Futures contract, one may be able to effectively trade dividends. Where a trader holds a position in one of the disclosed contracts they may further hold correlated positions which may allow for a reduced margin amount due to a reduction in their risk of loss. For example, a Dividend Accruing Futures contract may be correlated with an S&P 500 futures contract.

There are multiple potential advantages in these structures as outlined below:

Hedging Utility—The central purpose of any futures contract may be to provide a risk-management or hedging vehicle. Because the above introduced contracts are designed to mimic the cash flows of the instrument with which they are linked, the hedging utility of the products may be tremendously enhanced. Futures contracts today are generally linked with items such as stocks, bonds or swaps in much less direct fashion without any periodic cash flows at all. Thus, asset managers are compelled to drive often complicated "hedge ratios" to find the appropriate way to structure a hedge. While the monetary value of the futures contract may generally parallel the value of the hedged instrument, there are still many loose ends because of the inability to mimic the cash flows.

Hedge Accounting Issues—In the United States, one may apply so-called "hedge accounting principles" per the Financial Accounting Standards Board Statement No. 133 (FASB 133). This Statement is intended to address situations where, for example, one is holding an asset on the balance sheet on a cost basis—but may be compelled to recognize gains and losses in the underlying asset in each income statement to the extent that they may be "marked-to-market" (MTM). Under certain conditions, FASB 133 allows the asset holder to defer recognition of gains and losses in a futures contract or other derivative instruments until such time as the (presumably offsetting) loss or gain, respectively, is recognized with respect to the hedged asset.

But one must often jump through some hoops to qualify for hedging accounting practices. There are two methods to so qualify—the (1) correlation test; and (2) the critical terms test.

The correlation test means that one must apply an ex-ante and post-hoc test to ascertain sufficient correlation between the hedged item and the hedging vehicle. As a general rule, the accounting profession accepts an ex-ante correlation of 80% or a correlation coefficient (R-squared) of 90%. In addition, there is a post-hoc test to determine that the movements in the hedging vehicle fluctuated within a range of 80-125% of movements in the asset to be hedged. It is sometimes difficult to meet this post-hoc test criteria where there has been very little movement in the market.

Thus, hedgers typically prefer situations where they may apply the so-called critical terms test. I.e., where they are simply required to document that the various key terms in the hedged instrument correlate closely with the key terms of the derivative with which they are conducting the hedge. These critical terms may include a matching of the notional size of the hedged item and derivative; the maturation of the two items, etc. In addition, the cash flows of the hedged asset may, under some circumstances be considered amongst the critical terms.

The disclosed embodiments are intended to facilitate hedging by rendering it easier to qualify for FASB 133 hedge accounting treatment by reference to the critical terms test.

Futures as Investment Vehicles—While there is no strict rule in this regard, futures are generally considered and utilized as short-term "trading vehicles" that are often "flipped" with high frequency. On the other hand, items such as ETFs, Treasury securities, TIPS, IRS instruments are often regarded as longer-term or buy-and-hold "investment vehicles."

Even the tax treatment of futures under IRS Section 1256 promotes use of futures as short-term trading vehicles instead of long-term investment vehicles. This section of the Code requires that, under certain circumstances, the gain or loss on futures contracts be treated as if 60% were long-term capital gain or loss and 40% were short-term capital gain or loss. Thus, futures traders may qualify for a net reduced tax rate relative to a straight S-T capital item—but a higher rate relative to a L-T capital item. Thus, "traders" gravitate towards futures while "investors" who may hold an asset for an extended period might tend to gravitate towards these other items such as ETFs, Treasuries, TIPS or swaps.

Periodically, however, legislators consider measures that would "mainstream" the tax treatment of futures, eliminating the 60/40 tax treatment. Thus, futures product structures may be considered that are more familiar and palatable on the part of traditional long-term investors as a possible strategic initiative. These structures render futures more suitable as investment vehicles.

Cash/Futures Arbitrage—Cash/futures arbitrage is the process by which professional traders attempt to capitalize on small aberrations between the value of a futures contract and its underlying cash or spot instrument. To the extent that these transactions may be concluded on very small profit margins with minimal risk, the arbitrage is considered successful in promoting "cash/futures convergence"—ensuring that futures actually track or parallel or correlate highly with the underlying cash or spot instrument. Or to put it another way, that the futures price is efficiently determined.

These futures structures that mimic the value of the underlying cash or spot instrument promote efficient arbitrage by minimizing the economic or monetary differences between futures and spot instruments. This efficiency generates macroeconomic benefits in the sense that it enhances the potential effectiveness of a hedge, i.e., it enhances risk management benefits.

Rolling Spot—The disclosed Dividend Accruing Futures ("DAF"), Fixed Settlement/Coupon Generating Futures Contract, and Futures Contract Using Fixed vs. Floating Rate Pass-Through contracts, described in more detail below, share certain similarities to Rolling Spot contracts that contemplate a periodic pass-through from one party to the contract to the other party. However, Rolling Spot contracts have only been applied in the context of currency or FX products. Thus, the pass-through is a function of the applicable short-term interest rate in one currency that comprises the subject currency pair vs. the applicable short-term interest rate in the other currency that comprises the subject currency pair. E.g., if one created a Rolling Spot contract based upon the pairing between the U.S. dollar (USD) and Euro (EUR), then the periodic (daily) pass-through would be reflected in the relationship between USD short-term rates vs. EUR short-term rates.

The disclosed contracts differ in the sense that pass-through of a short-term rate component is not contemplated but rather, for example, a stock dividend accrual. Further distinguishing this contract from Rolling Spot contracts, the pass-through would be administered on a quarterly basis or semi-annual basis, noting, for example, that in the U.S., dividends are typically paid by corporations on a quarterly basis, U.S. Treasuries make coupon payments semi-annually or IRS contracts administer cash flows quarterly or semiannually—rather than on a daily basis as is typical with Rolling Spot contracts.

Rolling Spot contracts are frequently traded in over-the-counter (OTC) markets, most typically in London where they are often marketed as a subset of the "Contract for Differences" or CFD markets. The Rolling Spot concept was invented and deployed at CME in 1992.

TRAKRS—Some years ago, CME in partnership with Merrill Lynch, offered TRAKRS futures contracts which were futures contracts that featured a daily pass-through from long to short reflecting short-term interest rates along with some added amounts—that were NOT passed through from long to short but rather retained in the Clearing House and paid out as fees. Notably, this pass-through was never tied to dividends at all. These contracts utilized some other unique features as well, including an initial marketing period prior to launch where investors were effectively solicited to be brought in on the first effective date of the contract, akin to the way in which an IPO might be marketed. TRAKRS also featured a very small contract value to compete with ETFs; a 100% margin scheme for long investors; and, a no-action letter per which TRAKRS could be sold by SEC Registered Representatives (RRs), i.e., stock brokers, and placed in securities accounts.

Dividend Accruing Futures ("DAF") Contracts

The disclosed embodiments relate to a novel futures contract construction design featuring a periodic cash payment (passed through the exchange Clearing House or CH) from seller (short) to buyer (long). The futures contract is settled in cash to the spot value of the reference underlying index on the final settlement date. It is contemplated that the reference underlying index shall be the spot value of a specific stock index, e.g., the Standard & Poor's 500 (S&P 500), Dow Jones Industrial Average (DJIA), NASDAQ-100, etc. Likewise, the cash payment shall be established by reference to the accrued dividends associated with the reference underlying index, e.g., S&P 500, DJIA, NASDAQ-100, etc.

Current stock index futures contracts do not provide for any periodic payments of any sort but are simply settled in cash based upon the spot value of the underlying index upon the final settlement date. As a result, stock index futures prices will trade at levels, relative to the spot value of the underlying index, which reflect "cost of carry" considerations. Specifically, the futures price will reflect the spot price plus financing costs less dividends.

Stock Index Futures Price=Spot Stock Index Price+
Financing Charges-Dividends

This is a complexity that presents a "learning curve" of sorts to prospective traders in stock index futures. By providing for a periodic cash payment from short to long (most likely on a quarterly basis but possibly on a different schedule, e.g., daily, weekly, monthly, annually), our equation is altered to eliminate dividends, simplifying the futures contract design.

Stock Index Futures Price=Spot Stock Index Price+
Financing Charges

It is possible to list a futures contract that is settled by reference to the total return associated with a stock index, i.e., a "total return index futures." A total return index is one that incorporates both the fluctuations of the stocks that comprise the index PLUS the accrued dividends associated with those stocks. Note that the return on a total return index by rule exceeds the return on the spot version of the same index by an amount equal to the accrued dividends. However the issue associated with reference to a total return index is the quoted value of the total return index is very much disconnected from the quoted spot value of the index. This disconnection means that the average trader cannot "relate" to the value of the total return index as it does not resemble the spot index value with which he/she may be accustomed to referencing.

The disclosed dividend accruing futures maintain a much more direct link to the spot value of the index, adjusted only by finance charges represented in short-term interest rates.

Consider the following contract specifications for a possible S&P 500 Dividend Accruing Futures (DAF) contract which may resemble the construction of an Exchange Traded Fund (ETF) but registered and constructed as a futures contract.

An ETF is a security that tracks an index, a commodity or a basket of assets like an index fund, but trades like a stock on an exchange. ETFs experience price changes throughout the day as they are bought and sold. An ETF holds assets such as stocks, commodities, or bonds, and trades close to its net asset value over the course of the trading day. Most ETFs track an index, such as a stock index or bond index. ETFs may be attractive as investments because of their low costs, tax efficiency, and stock-like features. One of the most widely known ETFs is called the Spider (SPDR), which tracks the S&P 500 index and trades under the symbol SPY.

Exemplary Contract

S&P 500 Dividend Accruing Futures

| | |
|---|---|
| Contract Value | $1 × Standard & Poor's 500 Stock Price Index. E.g., if S&P 500 = 1,956.50 index points, value of one futures contract nominally valued at $1,956.50 (=$1 × 1,956.50 index points) |

-continued

| | |
|---|---|
| Contract Months | Listing of a single contract month in March, June, September and December quarterly cycle, extending five (5) years in future. E.g., if contract is listed in Dec-14, we might list single contract maturing Dec-19. |
| Quote Convention | Quoted in index points, e.g., 1,956.50, in minimum increments (or "tick size") of 0.10 index points (or $0.10 per contract unit) |
| Dividend Accrual Pass-Through | Dividend Accrual Pass-Through payment is made in cash on a quarterly basis, from short to long, on $3^{rd}$ Friday of quarterly cycle months, equivalent to dividends accrued associated with S&P 500 over quarterly period |
| Interest Rate Pass-Through | Interest Rate Pass-Through payment is made in cash on a quarterly basis, from long to short, on $3^{rd}$ Friday of quarterly cycle months, equivalent to average daily 3-month LIBOR rate applied to value of stock index, over quarterly period |
| Hours of Trade | Offered exclusively on CME Globex ® electronic trading platform on Mondays-Fridays from 8:30 am-3:15 pm (CT) |
| Trading Ends | 3:00 pm (CT) on business day preceding third Friday of contract month with contingencies if underlying index should not be published on that day |
| Final Settlement | Cash settled to Special Opening Quotation (SOQ) of S&P 500 |

This product design eliminates dividend accruals from futures contract pricing. As such, the contract will trade at levels more closely resembling spot values. This pricing mechanism therefore becomes much more closely aligned with spot values and becomes more intuitive from the perspective of prospective customers, notably including possible retail customers.

The essence of the disclosed embodiments is to pass-through an accrued dividend in the context of a futures contract. However, it may also further address the finance charge component of the cost of carry relationship.

There are two possible ways of addressing the interest rate component:

1. Interest Rate Pass-Through—Just as a periodic cash payment or pass-through may be required from short to long reflecting dividend accrual, a periodic cash pass-through from long to short reflecting short-term financing rates may be required. This interest rate pass-through may serve to neutralize the financing component of cost of carry. The interest rate pass-through may be administered on a daily or other periodic basis as appropriate and need not conform to the contemplated quarterly pass-through associated with accrued dividends. The net result, having eliminated both dividends and finance charges from our pricing considerations, is that the futures price should closely reflect the spot value of the index.
2. 100% or 50% Margining—Alternatively, it may be required that the long post 100% margining in cash which is passed through (via the Clearing House and Clearing Members) to the account of the short. The short is thereupon required to post collateral to secure the receipt of that cash. Or, a 50% cash payment from long to short, corresponding to typical margin requirements as administered in spot equity markets, may be required. In any event, this feature would essentially offset or at least mute to an extent the leverage associated with buying futures. As a result, this would tend to offset in whole or part financing charges from cost of carry considerations, and in turn cause the futures contract to align much more closely with spot index levels.

Note that Exchange-Traded Funds (or ETFs) typically align reasonably closely with the spot value of the index with which they are designed to track. These ETFs are margined like other stocks and are constructed to offer a periodic (generally quarterly) dividend.

Thus, these Dividend Accruing Futures contracts (DAFs) might be considered a prospective challenger to the popularity of ETFs. A DAF may be constructed with the 100% or 50% margining feature as described above coupled with a very small (for a futures contract) contract size that mimics the value of a single ETF share.

Fixed Settlement/Coupon Generating Futures Contracts

The disclosed embodiments relate to a novel futures contract construction design featuring a fixed final settlement price and periodic cash payments (passed through the exchange Clearing House or CH) from seller (short) to buyer (long) fixed at X % of the final settlement value.

The futures contract is settled in cash to an arbitrary fixed final settlement value, e.g., $100,000, and quoted in percent of that "par value," e.g., 100% of par, 103% of par, 98% of par. Likewise, the cash payment shall be established by reference to a fixed amount (or "coupon") applied to the fixed final settlement value. These cash payments or coupons may be quoted as X % of the final settlement value and payable on a semi-annual basis, e.g., 2% of $100,000 on an annual basis or 1% of $100,000 on a semi-annual basis. The disclosed embodiments use of fixed (as opposed to the customary variable) final settlement value for a futures contract; coupled with the pass-through payment of a fixed "coupon" from short to long on a periodic basis.

The disclosed embodiments present a novel futures contract construction design featuring a fixed final settlement price and periodic cash payments (passed through the exchange Clearing House or CH) from seller (short) to buyer (long) fixed at X % of the final settlement value.

In particular, the disclosed embodiments feature—(1) a futures contract that features a fixed, as opposed to variable, final settlement value; and, (2) a futures contract that contemplated a periodic cash payment or pass-through (as in passing from the account of the short to the account of the long through the Clearing House). Let's consider each in turn.

Fixed Final Settlement Value—Cash-settled futures contracts are typically settled, per the final settlement date, by reference to the (variable) value of some reference, e.g., a stock index, the value of a fixed income security index or interest rate, etc. The disclosed contract design contemplates that the final settlement value of the futures contract shall be fixed at some arbitrarily established value, e.g., $100,000 or $1,000,000, possibly quoted in percent of that "par value," e.g., 98% of par, 100% of par, 103% of par.

Coupon Payment—Current (cash-settled) futures contracts do not provide for any periodic payments of any sort but are simply settled in cash based upon the spot value of a specified underlying reference index or value upon the final settlement date. As a result, these futures contracts will trade at levels, relative to the spot value of the underlying instrument, which reflects "cost of carry" considerations. Specifically, the futures price will reflect the spot price plus financing costs less any payouts associated with the underlying instrument, possibly in the form of stock dividends, fixed income coupon payments, etc., and as appropriate in the context of the underlying reference instrument.

Futures Price=Spot Price+Financing Charges−Payouts

This is a complexity that presents a "learning curve" of sorts to prospective futures traders who are not otherwise familiar with practices in the futures markets. By providing for a periodic cash payment from short to long (most likely on a semi-annual basis but possibly on a different schedule, e.g., daily, weekly, monthly, annually), the equation for the disclosed contract is altered to eliminate payouts, simplifying the futures contract design.

Futures Price=Spot Price+Financing Charges

While these two features depart rather radically from anything that has ever been attempted within the regulatory context of futures markets, the net result is that the structure of the resulting futures contract will resemble that of a "garden-variety" fixed income security—specifically a bond or note. There may be some regulatory controversy regarding whether a futures contract's final settlement value may be fixed rather than variable to the extent that such feature may be said to eliminate the uncertainty of the final outcome. However, it may be argued that the uncertainty associated with the contract lies in the fact that the value of the contract will fluctuate in price in response to a variety of economic factors including prevailing market interest rates. Thus, there will be ample volatility or uncertainty in the value of the contract on an interim basis prior to its final settlement value.

There are certainly other futures contracts which are based upon fixed income securities, notably including CME Group's line of Treasury bond and note futures contracts. These contracts call for the delivery, in final satisfaction of the contract, of a Treasury security with certain specified characteristics and using a system of delivery price differentials [the "conversion factor (CF) invoicing system] to account for the varying valuation of Treasuries with somewhat different coupons and maturities.

These "classically constructed" Treasury futures have been in use as a risk-management tool dating back to 1977 with great success. But while these contracts generally reflect the economic value of Treasury securities, they are not constructed to precisely track the cash flows—including periodic coupon payments—of fixed income securities.

The disclosed embodiments track a specifically defined fixed income instrument in terms of maturity and (significantly) coupon payments.

This contract features two rather unique features—(1) a fixed final settlement value; and (2) a periodic cash pass-through constructed as a "coupon payment." The first of these features is, to our knowledge, completely unique in the context of futures markets. There are, however, some products or possibly intellectual properties that utilize periodic cash pass-through payments. Significantly, none of these items—as documented below—were ever constructed as a coupon payment.

Coupon Bearing Futures (CBFs)—Consider the following contract specifications for a possible Coupon Bearing Futures (CBF) contract which are intended to reflect the construction and cash flows of a coupon bearing fixed income instrument such as a Treasury bond or note—but registered and constructed as a futures contract.

Exemplary Contract

Coupon Bearing Futures (CBF)

| | |
|---|---|
| Contract Value | Settled in Cash to a Final Settlement Value of $100,000 ("par value") |
| Contract Months | Listing of a single contract month in March, June, September and December quarterly cycle, extending two (2), five (5), ten (10) or thirty (30) years in future. E.g., if contract is listed in Dec-14, we might list single 5-year contract maturing Dec-19. |
| Quote Convention | Quoted in percent of par in minimum increments of one-half of one thirty-second or $\frac{1}{2}$ of $\frac{1}{32}^{nd}$ of 100% of par. This equates to $15.625 per "tick." |
| Coupon Pass-Through | Coupon Pass-Through payment is made in cash on the semi-annual anniversary of the original listing date of the contract, paid from short to long. Coupon payment is defined as X % of par value (on an annual basis) or $\frac{1}{2}$ of X % of par value (on a semi-annual basis). Thus, a 2% quoted coupon implies a $1,000 semi-annual payment. |
| Interest Rate Pass-Through | Interest Rate Pass-Through payment is made in cash on a semi-annual basis, from long to short, the semi-annual anniversary of the original listing date of the contract, equivalent to average daily 3-month LIBOR rate applied to value of stock index, over quarterly period |
| Margins | Coupon Bearing Futures to be margined and leveraged in much the same way as futures are margined and leveraged currently - by reference to 1-day's close-to-close price risk |
| Hours of Trade | Offered exclusively on CME Globex ® electronic trading platform on Mondays-Fridays from 8:30 am-3:15 pm (CT) |
| Trading Ends | 3:00 pm (CT) on business day preceding third Friday of contract month with contingencies if underlying index should not be published on that day |
| Final Settlement | Cash settled to Final Settlement Value of $100,000 ("par value") |

Money Market Futures (MMFs)—In another application of this invention, that would rely solely upon the fixed final settlement value feature—and which does not contemplate the periodic payment of a "coupon," we may construct a "Money Market Futures" (MMF) contract. An MMF is generally a futures contract that is listed with a final settlement date that is one year or less in duration. MMFs do not contemplate periodic coupon payments but are settled in cash at a fixed final settlement date, akin to CBFs as explained above.

The net result is that the MMF contract may reflect the cash flows associated with a money market instrument and may offer useful properties from a risk-management or hedging perspective. Such a contract may be constructed as shown below.

Exemplary Contract

Money Market Futures (MMF)

| | |
|---|---|
| Contract Value | Settled in Cash to a Final Settlement Value of $1,000,000 ("par value") |
| Contract Months | Listing of a single contract month in March, June, September and December quarterly cycle, extending no more than one year in the future. E.g., if contract is listed in Dec-14, we might list single 1-year contract maturing Dec-15. |
| Quote Convention | Quoted in percent of par value in 0.0001%. E.g., a quote of 99.6234% of par equates to $992,340 (=99.6234% × $1,000,000). Minimum price increment or tick size of $10 (=0.0001% × $1,000,000) |
| Daily Interest Rate Pass-Through | Interest Rate Pass-Through payment is made in cash on a daily basis, from long to short, equivalent to a designated short-term interest rate, e.g., effective Fed Funds rate, applied to the final settlement or par value of contract. |
| Margins | MMFs to be margined and leveraged in much the same way as futures are margined and leveraged currently - by reference to 1-day's close-to-close price risk |
| Hours of Trade | Offered exclusively on CME Globex ® electronic trading platform on Mondays-Fridays from 8:30 am-3:15 pm (CT) |
| Trading Ends | 3:00 pm (CT) on business day preceding third Friday of contract month with contingencies if underlying index should not be published on that day |
| Final Settlement | Cash settled to Final Settlement Value of $1,000,000 ("par value") |

Aligning Cash-Flows Even More Closely—The essence of the disclosed embodiments is the fixed final settlement value coupled (at least in the case of the CBF) with a coupon-style cash pass-through—all in the context of a futures contract. The concept of a periodic interest rate pass-through as part of the patent invention is included in the possible futures contract specifications shown above as a means of further addressing the cost of carry considerations that cause futures prices to depart from the value of a cash or spot item.

This proposed periodic cash pass-through from long to short reflecting short-term financing rates is proposed to neutralize the financing component of cost of carry. The interest rate pass-through may be administered on a daily or semi-annual or other periodic basis as appropriate. In any event, the net result is that the futures price should closely reflect the spot value of the index.

With respect to converging the pricing of these products with bonds, notes or money market instruments, it may be required that the long post 100% margining in cash which is passed through (via the Clearing House and Clearing Members) to the account of the short. The short is thereupon required to post collateral to secure the receipt of that cash. This feature would essentially offset the leverage associated with buying futures. As a result, this would tend to offset financing charges from cost of carry considerations, and in turn cause the futures contract and its associated cash flows to align much more closely with spot index levels.

CBFs and MMFs are designed to mimic the cash flows associated with coupon-bearing fixed income; and, money market instruments, respectively. By more closely aligning the cash flows of an instrument registered and offered as a futures contract, we hope to provide risk-management or hedging utilities.

Inflation Protected Futures ("IPF"'s)

The disclosed embodiments relate to Inflation Protected Futures ("IPF"'s) which are novel futures contracts designed to link closely with inflation as reflected in the Consumer Price Index (CPI), or possibly other measures of inflation such as the variations on CPI, PPI, Personal Consumption Expenditures, etc. They are cash-settled futures designed to mimic the cash flows associated with Treasury Inflation Protected Securities (TIPS). Treasury Inflation-Protected Securities (or TIPS) are the inflation-indexed bonds issued by the U.S. Treasury. The principal is adjusted to the Consumer Price Index (CPI), the commonly used measure of inflation. When the CPI rises, the principal adjusts upward. If the index falls, the principal adjusts downwards. [9] The coupon rate is constant, but generates a different amount of interest when multiplied by the inflation-adjusted principal, thus protecting the holder against the official inflation rate (as asserted by the CPI).

This unique futures contract design features the following:

1. Variable Notional Contract Size—The contract size or trading unit of an IPF is initially established at some arbitrary par value, e.g., $100,000, and may be quoted in percent of par, e.g., 98% of par, 100% of par, 103% of par. Henceforth, the contract unit is linked to the raw value of the Non-Seasonally Adjusted (NSA) U.S. City Average All Items Consumer Price Index for all Urban Consumers (CPI-U), released on a monthly basis. (See www.bls.gov/cpi/) Specifically, the face value of a security will fluctuate as a function of the security's Index Ratio (IR) as identified by the U.S. Treasury Department. (The Treasury Department published index ratios (IR) for reference in the context of Treasury Inflation Protected Securities (TIPS). The IR is the ratio of the Reference CPI for the trade settlement date to the Reference CPI for the TIPS issue's dated date. The Index Ratio reflects realized inflation since the issue date and is used to accrete the face value of the security. These figures are published at the following hyperlink: http://www.treasurydirect.gov/instit/annceresult/tipscpi/tipscpi.htm) E.g., assume that the futures contract is initially established with an IR=1.00 or 100% of par. Assume further that the Index Ratio (IR) increased by 10% and was at 1.10. Thus, the nominal value of an IPF is adjusted to 110% of par (=100%×1.10). Should the value of CPI-U should decline over the life of the IPF, the notional value of an IFP at futures contract maturity is established at the original par value, providing protection in a deflationary environment. Note that this contract is distinct from other futures contracts offered in that the interim and final notional values of the contract are periodically reset by reference to inflation. The final cash settlement value is established at the adjusted notional contract value linked to the IR, with the exception that it cannot be less than 100% of par at expiration. This "floor" feature is likewise unique to a futures contract.

2. Coupon Payment—In addition to the variable notional contract size linked to inflation, the contract also offers a periodic (e.g. semi-annual) cash payment to be paid from the account of the short to the account of long, passed through the Exchange Clearing House. This coupon payment is fixed, upon contract listing, at X % of the current notional contract value of the IPF. E.g., if the annual coupon of an IPF was originally established at 2% and the notional futures contract value is 100% of a par value of $100,000, the annual payment would be 2% of 100% of $100,000 or $2,000. (It is contemplated that this value may be paid in two semi-annual payments of $1,000 each for a total of $2,000.) But if the IR had increased by 10% and was at 1.10, the IPF's notional value would be adjusted to 110% of par or $110,000. The coupon rate remains at 2%, resulting in an interest payment of 2.2% ($2,200) on an annual basis or 1.1% ($1,100) on a semi-annual basis.

The disclosed embodiments relate to the use of the variable futures contract size linked to inflation; coupled with the pass-through payment of a coupon from short to long on a periodic basis that is fixed as a percentage amount of par value but is implicitly linked to inflation as a result of the variable futures contract size linked to inflation measures. The disclosed embodiments present a novel futures contract construction design that is intended to mimic the cash flows associated with a Treasury Inflation Protected Security (TIPS) instrument as currently issued on a regular basis by the U.S. Treasury Department.

This futures contract—an Inflation Protected Futures (IPF)—is unique insofar as it is a futures contract that . . . (1) is cash settled to a notional value linked to inflation; and (2) calls for a periodic pass-through from short to long of a cash value that is established as a fixed proportion of the notional value of the contract—implicitly linking this coupon to inflation.

The disclosed embodiments feature—(1) a futures contract that features a periodically administered notional value that is linked to CPI-U; and, (2) a futures contract that contemplated a periodic cash payment or pass-through (as in passing from the account of the short to the account of the long through the Clearing House) that is fixed as a percentage value but implicitly linked to inflation in light of feature #1.

No other contract design or system is tied to measures of inflation in this way and which is designed to mimic the cash flows and, therefore, value of a TIPS instrument.

Exchanges, including CME Group, have listed CPI futures in the past. These products were cash settled to the fluctuating value of the CPI as the final settlement date. Although the concept was sound, these products uniformly failed. Still, these products did not mimic the cash flows or value of a TIPS instrument as directly as does the currently proposed solution This contract features two rather unique features—(1) a periodically (monthly) adjusted notional value, linked to CPI-U; and (2) a periodic cash pass-through constructed as a "coupon payment" but implicitly tied to inflation because it is applied to the periodically adjusted notional value of the contract.

Inflation Protected Futures (IPFs) are uniquely designed to mimic the cash flows associated with a Treasury Inflation Protected Security (TIPS) as issued by the U.S. Treasury Department. The table below summarizes the product design.

Exemplary Contract

Inflation Protected Futures (IPFs)

| | |
|---|---|
| Contract Value | Settled in Cash to a Final Settlement Value of $100,000 ("par value") adjusted by reference to fluctuations in the raw value of CPI-U. Notional value of futures contract to be adjusted monthly by reference to Index Ratio ("IR") as identified by U.S. Treasury Dept. E.g., if the IR increases by 10% from 100% of par, notional contract value is increased to 110% or par or $110,000. |
| Contract Months | Listing of a single contract month in March, June, September and December quarterly cycle, extending two (2), five (5), ten (10) or thirty (30) years in future. E.g., if contract is listed in Dec-14, we might list single 5-year contract maturing Dec-19. |
| Quote Convention | Quoted in percent of par in minimum increments of one-half of one thirty-second or $\frac{1}{2}$ of $\frac{1}{32}^{nd}$ of 100% of par. This equates to $15.625 per "tick." |
| Coupon Pass-Through | Coupon Pass-Through payment is made in cash on the semi-annual anniversary of the original listing date of the contract, paid from short to long. Coupon payment is defined as X % of (periodically adjusted) par value (on an annual basis) or $\frac{1}{2}$ of X % of par value (on a semi-annual basis). Thus, a 2% quoted coupon implies a $1,000 semi-annual payment based upon par value of $100,000. |
| Interest Rate Pass-Through | Interest Rate Pass-Through payment is made in cash on a semi-annual basis, from long to short, the semi-annual anniversary of the original listing date of the contract, equivalent to average daily 3-month LIBOR rate applied to value of stock index, over quarterly period |
| Margins | Coupon Bearing Futures to be margined and leveraged in much the same way as futures are margined and leveraged currently - by reference to 1-day's close-to-close price risk |
| Hours of Trade | Offered exclusively on CME Globex ® electronic trading platform on Mondays-Fridays from 8:30 am-3:15 pm (CT) |

| | |
|---|---|
| Trading Ends | 3:00 pm (CT) on business day preceding third Friday of contract month with contingencies if underlying index should not be published on that day |
| Final Settlement | Cash settled to Final Settlement Value of $100,000 ("par value") |

Aligning Cash-Flows Even More Closely—The disclosed embodiments create a futures contract that mimics the cash flows and valuation of a TIPS instrument—but within the context of a futures contract. The concept of a periodic short-term interest rate or financing rate pass-through as part of the patent invention may be included in the possible futures contract specifications shown above as a means of further addressing the cost of carry considerations that cause futures prices to depart from the value of a cash or spot item.

This proposed periodic cash pass-through from long to short reflecting short-term financing rates is proposed to neutralize the financing component of cost of carry. The interest rate pass-through may be administered on a daily or semi-annual or other periodic basis as appropriate. In any event, the net result is that the futures price should closely reflect the spot value of the index.

With regards to converging the pricing of these products with bonds, notes or money market instruments, it may be required that the long post 100% margining in cash which is passed through (via the Clearing House and Clearing Members) to the account of the short. The short is thereupon required to post collateral to secure the receipt of that cash. This feature would essentially offset the leverage associated with buying futures. As a result, this would tend to offset financing charges from cost of carry considerations, and in turn cause the futures contract and its associated cash flows to align much more closely with spot index levels. This feature would represent an alternative to the periodic short-term interest rate pass through as outlined in the table above.

IPFs are designed to mimic the cash flows associated with a TIPS instrument. By more closely aligning the cash flows of an instrument registered and offered as a futures contract, we hope to provide risk-management or hedging utilities.

Futures Contract Using Fixed Vs. Floating Rate Pass-Through

The disclosed embodiments relate to a novel futures contract construction design featuring a series of periodic cash payments (passed through the exchange Clearing House or CH) between seller (short) to buyer (long). The value of this pass-through amount is established periodically by reference to the differential between an established fixed rate (x %) and a floating rate (y %). The fixed rate is established in advance of contract listing while the floating rate is established at each periodic pass-through date by reference to current market conditions.

The futures contract is settled in cash to an arbitrary fixed final settlement value, e.g., $100,000, and quoted in percent of that "par value," e.g., 100% of par, 103% of par, 98% of par. Likewise, the cash payment shall be established by reference to the difference between a pre-established fixed amount (or "coupon") vs. a floating amount that may be tied to any number of different rates, including the ICE Administration 3-month LIBOR rate, noting that is the same rate vs. which CME Eurodollar futures are settled. These cash payments or coupons may be quoted as X % of the final settlement value and payable on a periodic basis, e.g., quarterly or semi-annually.

Other features that are relatively unique may likewise be applied to the futures contract. The disclosed embodiments relate to the use of fixed vs. floating rate pass-through payment of a fixed "coupon" from short to long on a periodic basis.

The net result of this contract design is to create a futures contract whose cash flows, and resulting valuation, closely parallels the cash flows and valuation of an actual interest rate swap (IRS).

Previous contract designs that have been used over the years to address a futures contract that is based on an IRS instrument were:

1. CME Swap Contract—In the early 2000s, CME launched an IRS futures contract that was constructed to dovetail with, and be readily "spreadable," vs. a Eurodollar futures contract. It was cash settled to the quoted fixed rate or coupon rate associated with IRS instruments of different tenors, e.g., 2-years, 5-years, 10-years. It was quoted as 100—IRS Rate using the so-called "IMM Index." This contract traded moderately for some years but eventually fell into disuse and was delisted.

2. CBOT Swap Contract—About the same time as CME launched its original swap futures contract, the CBOT launched their own version of a swap contract. It was constructed to dovetail with, and be readily spreadable, vs. CBOT Treasury futures contracts. It was settled in cash to a value calculated as the price of a bond with a nominal coupon rate given a yield equal to the fixed rate or coupon rate associated with IRS instruments of different tenors, e.g., 5-years, 10-years, 30-years. It was quoted in percent of par in increments of $\frac{1}{32}$nd of par or fractions thereof—akin to a Treasury security or Treasury futures contract. This contract also traded moderately but fell into disuse.

3. LIFFE Swapnote Futures—The London International Financial Futures Exchange (LIFFE) also listed a swap based futures contract in the early 2000s referred to as swapnote futures. It was constructed in a manner that was very similar to that used by CBOT. However, it utilized a more involved calculation to identify the value of the contract. Rather than using a singular yield like the CBOT model, it referred to various values for IRS instruments across the spectrum of the yield curve—the swap curve—to find the value of each individual reset or payment date. This design was offered under license from a firm which had patented this specific concept. These contracts continue to be lightly traded at LIFFE.

4. CME Group Deliverable Swap Futures (DSFs)—In December 2012, CME Group launched DSFs. These are futures contracts that call for the delivery of actual IRS instruments of varying tenors (2-year, 5-year, 10-year and 30-year) that are cleared and held by the CME Clearing House (CH). These contracts are quoted as 100 less the Non-Par Value (NPV) of the swap. They are listed with a pre-established coupon rate. These contracts are actively traded and growing in popularity.

The swap futures contracts discussed above have all achieved varying degrees of success or failure, as the case may be. They all reflect the value, to one degree or another, of an actual interest rate swap. Significantly, however, none of them truly parallel the cash flows associated with an actual IRS instrument.

The current proposal for an IRSF addresses this issue with use of a periodic fixed vs. floating rate cash flow.

It is certainly very feasible to use the swap contracts discussed above to hedge the risks associated with holding an actual IRS instrument. However, in all cases, this involves some effort to model the sensitivity of the value of these futures contract relative to the sensitivity of the actual IRS instrument to be hedged, to a dynamic rate environment.

The disclosed embodiments are intended to create a futures contract design which is simpler and more straightforward to deploy for risk management purposes. Because we seek to mimic the cash flows of an IRS instrument, this should minimize the modeling necessary to create an efficacious hedge strategy.

In order to illustrate how this contract might be constructed, consider the following summary futures contract design specifications which features the fixed final settlement value coupled with the periodic cash payment or pass-through tied to a value calculated as a fixed vs. floating rate payment.

Exemplary Contract

Interest Rate Swap Futures (IRSFs)

| | |
|---|---|
| Contract Value | Settled in Cash to a Final Settlement Value of $100,000 ("par value") |
| Contract Months | Listing of a single contract month in March, June, September and December quarterly cycle, extending two (2), five (5), ten (10) or thirty (30) years in future. E.g., if contract is listed in Dec-14, we might list single 5-year contract maturing Dec-19. |
| Quote Convention | Quoted in percent of par value, e.g., 98%, 100%, 103% of the $100,000 par value. Quoted in minimum increments or ticks of 0.01% of par which equates to $10.00 per tick (=0.01% × $100,00) |
| Fixed vs. Floating Rate Pass-Through | The differential between the established fixed coupon rate and floating rate is paid in cash on the quarterly anniversary of the original listing date of the contract. If fixed coupon rate > floating rate, the net payment flows from short to long; if fixed coupon rate < floating rate, the net payment flows from long to short. |
| Fixed Coupon Rate | Is established by Exchange at time of contract listing to generally reflect prevailing swap rates, rounded to nearest $1/8^{th}$ of 1%, e.g., 1.125%, 1.25%, 1.375%, 1.500%. Fixed coupon rate paid semi-annually based upon par value of contract. |
| Floating Rate | Is established by reference to 3-month LIBOR rate and paid quarterly based upon par value of contract. |
| Margins | IRSFs to be margined and leveraged in much the same way as futures are margined and leveraged currently - by reference to 1-day's close-to-close price risk |
| Hours of Trade | Offered exclusively on CME Globex ® electronic trading platform on Mondays-Fridays from 8:30 am-3:15 pm (CT) |
| Trading Ends | 3:00 pm (CT) on business day preceding third Friday of contract month with contingencies if underlying index should not be published on that day |
| Final Settlement | Cash settled to Final Settlement Value of $100,000 ("par value") |

IRSFs are designed to mimic the cash flows associated with fixed vs. floating rate IRS instruments. By more closely aligning the cash flows of an instrument registered and offered as a futures contract, we hope to provide risk-management or hedging utilities.

Cash Flow Examples

Theoretical examples of the cash flows potentially associated with each of the four (4) contract designs are set forth below.

Dividend Accruing Futures (DAFs)

Assume that a futures contract is created that is valued at $50×S&P 500 Stock Market Index. The value of a conventionally constructed stock index futures may be modeled, by reference to "cost of carry" considerations as follows.

Conventional Futures = Spot + Finance Costs − Anticipated Dividends =

$$\text{Spot} \times \left[1 + \left(\frac{\text{days}}{360}\right) \times \text{Rate}\right] - \text{Anticipated Dividends}$$

Thus, the value of a conventionally constructed stock index futures price may be calculated as 1,892.66 as of the 93rd day until expiration given a spot index value of 1,900.00 and an assumed financing or interest rate of 0.40%. But the Dividend Accruing Futures or DAF price would be further adjusted in anticipation of the dividend pass-through amount.

DAF=Spot+Finance Costs−Anticipated Dividends+ Anticipated Pass Through Amount

Note that the simplifying assumption of a 9.00 index point quarterly accrual of dividends without any "surprises" or unanticipated deviances from that assumption is being used.

Thus, a somewhat greater value for the DAF is calculated at 1,910.66 on the $93^{rd}$ day until expiration. This value anticipates the 9.00 index point pass-through on the $90^{th}$ day until expiration along with a further assumed 9.00 index point pass-through on the final settlement day some 93 days later.

| Days til Expiration | Stock Index | Conventional Futures | Conventional Basis | DAF | DAF Basis | Nominal Contract Value | Anticipated Dividends | Pass-Through |
|---|---|---|---|---|---|---|---|---|
| 93 | 1,900.00 | 1,892.66 | −7.34 | 1,910.66 | 10.66 | $95,533 | 9.30 | |
| 92 | 1,920.00 | 1,912.76 | −7.24 | 1,930.76 | 10.76 | $96,538 | 9.20 | |
| 91 | 1,890.00 | 1,882.81 | −7.19 | 1,900.81 | 10.81 | $95,041 | 9.10 | |

-continued

| Days til Expiration | Stock Index | Conventional Futures | Conventional Basis | DAF | DAF Basis | Nominal Contract Value | Anticipated Dividends | Pass-Through |
|---|---|---|---|---|---|---|---|---|
| 90 | 1,890.00 | 1,882.89 | −7.11 | 1,891.89 | 1.89 | $94,595 | 9.00 | 9.00 |
| 89 | 1,870.00 | 1,862.95 | −7.05 | 1,871.95 | 1.95 | $93,597 | 8.90 | |

It has been assumed, for the purposes of illustration, that the spot index value is perfectly stable on the day prior to the pass-through and on the day of the actual pass-through. Note that the DAF basis declines substantially on the pass-through day. It will be therefore appreciated that this mimic the behavior of a stock or ETF on the ex-dividend date.

Note that the pass-through amount may be anticipated but not necessarily known with certainty until it is fully accrued by the periodic pass-through date.

Fixed Settlement/Coupon Generating Futures

This contract design is intended to mimic the behavior of a Treasury security that generates semi-annual interest payments. The value of the futures contract is fixed as of the final settlement date at a nominal value, call it $100,000.

The value of a conventionally constructed futures contract may vary prior to that point in time as a function of cost of carry considerations. This is a function of the finance costs associated with buying and holding the security—or short-term interest rates less any anticipated payouts associated with the security in the form of coupon payments. This is very much analogous to the analysis above in the context of DAFs.

Conventional Futures=Spot+Finance Costs−Anticipated Coupons

But the value of the hybrid futures contract contemplated here is further adjusted by the anticipated receipt of the pass-through—which represents a pseudo coupon payment as it is calculated as a function of a fixed rate applied to a fixed base or principle value.

Hybrid Futures=Spot+Finance Costs−Anticipated Coupons+Pass Through Amount

For purposes of this exposition, it is assumed that yields are completely stable and, as a result, the futures price is quite stable apart from the impact of cost of carry considerations. This is an unrealistic assumption but it nonetheless allows one to isolate the impact of carry considerations upon the value of a conventional futures vs. one that is constructed using our hybrid method and featuring a pass-through from short to long that resembles a coupon payment.

Note that the value of the hybrid futures contract experiences a dramatic decline on the day of the pass-through payment. This is akin to the way in which an actual fixed income security would behave in the sense that when one buys a Treasury note or bond, one pays the price of the security plus interest accrued since the last semi-annual interest payment date. Note that the hybrid futures contract value performs akin to the way in which the "all-in" value of a cash note or bond would behave approaching a coupon payment date.

Inflation Protected Futures

Inflation Protected Futures ("IPF"'s) represent a variation on the theme of a security that mimics the cash flows of a cash bond or note, as discussed above. But these futures contracts are intended to mimic the performance of a Treasury Inflation Protected Security or TIPS. TIPS are sold by the U.S. Treasury with a stated principle or face value and a fixed coupon paid semi-annually. But the principal value of the security is tied to the Consumer Price Index for All Urban Consumers or CPI-U. Every month, as the CPI-U is released, the effective principal value of the security is adjusted. Thus, if the security has an initial principle value of $100,000 but inflation rises by 3% (for example) over the course of a year, the principal value is adjusted upwards to $103,000. The IPF futures contract works in an analogous manner.

To illustrate, assume that the IPF has a face or principal value of $100,000. But on the day on which there is 180 days remaining until IPF expiration, CPI-U is released and shows an (unexpected) gain of +1% in inflation. Thus, the principal value of the futures contract is upwardly adjusted to $101,000 or upwardly adjusted by 1%. Assume that the coupon payment of 2% annually or 1% on a semi-annual basis is due on the day when there are 181 days left until expiration. This implies that pass-through amount from short to long would equal $1,000 or 1% of $100,000. Had the pass-through value become due when the principal value was upwardly adjusted to $101,000, that pass-through value would have been $1,010 (=1% of $101,000).

| Days | Fixed Final Settlement | Conventional Futures | Normal Basis | Hybrid Futures | Hybrid Basis | Pass-Through | Anticipated Coupons |
|---|---|---|---|---|---|---|---|
| 183 | $100,000 | $99,187 | $813.33 | $101,187 | −$1,187 | | $1,016.67 |
| 182 | $100,000 | $99,191 | $808.89 | $101,191 | −$1,191 | | $1,011.11 |
| 181 | $100,000 | $99,196 | $804.44 | $101,196 | −$1,196 | | $1,005.56 |
| 180 | $100,000 | $99,200 | $800.00 | $100,200 | −$ 200 | $1,000 | $1,000.00 |
| 179 | $100,000 | $99,204 | $795.56 | $100,204 | −$ 204 | | $ 994.44 |

| Days | Principal Value | Normal Futures | Normal Basis | Hybrid Futures | Hybrid Basis | Pass-Through | Coupon |
|---|---|---|---|---|---|---|---|
| 183 | $100,000 | $99,187 | $813.33 | $101,197 | −$1,197 | | $1,016.67 |
| 182 | $100,000 | $99,191 | $808.89 | $101,201 | −$1,201 | | $1,011.11 |
| 181 | $100,000 | $99,196 | $804.44 | $100,206 | −$ 206 | $1,000 | $1,005.56 |

-continued

| Days | Principal Value | Normal Futures | Normal Basis | Hybrid Futures | Hybrid Basis | Pass-Through | Coupon |
|---|---|---|---|---|---|---|---|
| 180 | $101,000 | $100,192 | $808.00 | $101,202 | −$202 | | $1,010.00 |
| 179 | $101,000 | $100,196 | $803.51 | $101,206 | −$206 | | $1,004.39 |

Again, the value of the IPF mimics the "all-in" value (price plus accrued interest) of the TIPS. We have also applied the very simplifying (and ultimately unrealistic) assumption that marketplace yields and therefore price levels are stable over the course of these days. Note, that regardless of the fluctuations of the market, the principal value against which the final futures settlement price are based and against which the coupon pass-through amount is calculated, is as indicated in our table.

Fixed Vs. Floating Rate Futures

The Fixed vs. Floating Rate Futures (Interest Rate Swap Futures ("IRSF")) is a futures contract that mimics the performance of a fixed vs. floating interest rate swap instrument as might be offered on an over-the-counter (OTC) basis. For purpose of this illustration, assume that the futures contract is constructed to provide for a quarterly pass-through that reflects a quarterly coupon of 2% and a floating rate tied to the ICE Administration Ltd. LIBOR rate—which happens to be 1.6% in our example. Assume for purposes of this illustration that rates are stable over the course of the days depicted in our example. The principal value of the futures contract is fixed at $100,000 at expiration. We have also applied other simplifying assumptions including use of a Act/360-day count basis.

The differential between the 2% fixed rate and the 1.4% floating rate is 0.6% on an annualized basis. Applied semi-annual to the principal value of $100,000, we have a pass-through payment from short to long equal to $300 [=(2%-1.4%)×$100,000].

| Days | Principal Value | Normal Futures | Normal Basis | Hybrid Futures | Hybrid Basis | Pass-Through | Fixed vs. Floating |
|---|---|---|---|---|---|---|---|
| 183 | $100,000 | $99,898 | $101.67 | $100,498 | −$498 | | $305.00 |
| 182 | $100,000 | $99,899 | $101.11 | $100,499 | −$499 | | $303.33 |
| 181 | $100,000 | $99,899 | $100.56 | $100,199 | −$199 | $300 | $301.67 |
| 180 | $100,000 | $99,900 | $100.00 | $100,200 | −$200 | | $300.00 |
| 179 | $100,000 | $99,901 | $ 99.44 | $100,201 | −$201 | | $298.33 |

Again, this product mimics the cash flows of interest rate swap instruments that are available for trading on an OTC basis.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:

1. A computer implemented method of facilitating a payment between a first trader and a second trader by a central counterparty which requires the first and second traders to each maintain associated accounts in which funds are deposited to cover trading losses, the central counterparty comprising a payment processor, a settlement processor, a margin processor, and a memory coupled with the payment, settlement and margin processors, the method comprising:
providing, by the central counterparty, an account database stored in the memory, the account database comprising a first account record associated with the first trader which includes data reflecting funds maintained on account to cover trading losses by the first trader, and a second account record associated with the second trader which includes data reflecting funds maintained on account to cover trading losses by the second trader;
performing, periodically by the central counterparty, based on a first position in a first instrument held by the first trader to which the second trader is a counterparty:
determining, by the payment processor, the amount of a payment to be made from one of the first or second trader to the other of the first or second trader in advance of settlement thereof based on a percentage of a notional value of the first instrument, the first instrument having a fixed settlement value and a notional value which varies as a function of an inflation index;
assigning, automatically by the payment processor, the first trader a second position in a futures contract characterized by a settlement date, a quantity and a price, the second position being characterized by a value based on the quantity and the price of the futures contract as of the assigning;
assigning, automatically by the payment processor, the second trader a third position, counter to the second position, in the futures contract, the first and second traders not being identified to each other, wherein the assigning to the first and second traders is automatically performed by the central counterparty based on a another position in another instrument held by the first trader to which the second trader is a counterparty;
valuing, by the settlement processor upon occurrence of the settlement date, the futures contract at a spot value different from the price of the futures contract, the spot value being based on the determined payment amount;
modifying, by the margin processor, the first and second account records in the account database to reflect a credit to the account of the first trader and a debit from the account of the second trader in the amount of the difference between the value of the second position and the spot value when the difference represents a loss for the second trader; and
modifying, by the margin processor, the first and second account records in the account database to reflect a debit from the account of the first trader and a credit to the account of the second trader in the amount of the difference between the value of the second position and the spot value when the difference represents a loss for the first trader; and
wherein the first position and the periodic payment amounts are characterized by economic characteristics similar to economic characteristics of a Treasury Inflation Protected Security.

2. The computer implemented method of claim 1 wherein the inflation index comprises the consumer price index.

3. The computer implemented method of claim 1 further comprising:
when the account of the first trader is credited and the account of the second trader is debited:
determining, by the payment processor, the amount of an interest payment to be made from the first to the second trader in advance of settlement thereof based on the amount credited to the first trader;
assigning, by the payment processor, the first trader a fourth position in a futures contract characterized by a settlement date, a quantity and a price, the fourth position being characterized by a value based on the quantity and the price of the futures contract as of the assigning;
assigning, by the payment processor, the second trader a fifth position, counter to the fourth position, in the futures contract, the first and second traders not being identified to each other;

valuing, by the settlement processor upon occurrence of the settlement date, the futures contract at a spot value different from the price of the futures contract, the spot value being based on the determined interest payment amount; and modifying, by the margin processor, the first and second account records in the account database to reflect a debit from the account of the first trader and a credit to the account of the second trader in the amount of the difference between the value of the second position and the spot value; and when the account of the first trader is debited and the account of the second trader is credited:

determining, by the payment processor, the amount of an interest payment to be made from the second to the first trader in advance of settlement thereof based on the amount credited to the first trader;

assigning, by the payment processor, the first trader a sixth position in a futures contract characterized by a settlement date, a quantity and a price, the sixth position being characterized by a value based on the quantity and the price of the futures contract as of the assigning;

assigning, by the payment processor, the second trader a seventh position, counter to the sixth position, in the futures contract, the first and second traders not being identified to each other;

valuing, by the settlement processor upon occurrence of the settlement date, the futures contract at a spot value different from the price of the futures contract, the spot value being based on the determined interest payment amount; and modifying, by the margin processor, the first and second account records in the account database to reflect a credit to the account of the first trader and a debit from the account of the second trader in the amount of the difference between the value of the second position and the spot value.

4. The computer implemented method of claim 1 wherein the quantity of futures contract is 1, the assigning of the second and third positions to the first and second traders respectively, further comprising assigning the second and third positions in a plurality of the futures contract, the quantity of the plurality of the futures contract being determined based on the payment amount.

5. The computer implemented method of claim 1 wherein the value of the second and third positions as of the assigning is zero.

6. The computer implemented method of claim 1 wherein the value of the second and third positions as of the assigning is non-zero.

7. The computer implemented method of claim 1 wherein the determining of the payment amount occurs upon occurrence of the settlement date.

8. The computer implemented method of claim 1 wherein the performing occurs one of quarterly, semiannually, or annually.

9. The computer implemented method of claim 1 wherein the quantity of the futures contract is 1, the assigning of the second and third positions to the first and second traders respectively, further comprising assigning the second and third positions in a plurality of the futures contract, the quantity of the plurality of the futures contract being determined based on the payment amount.

10. The computer implemented method of claim 1 wherein the spot value is valued based on a multiplier and a final settlement value.

11. The computer implemented method of claim 1 wherein the first instrument comprises a futures contract.

12. A system for facilitating a payment between a first trader and a second trader by a central counterparty which requires the first and second traders to each maintain associated accounts in which funds are deposited to cover trading losses, the system comprising:

an account database stored in a memory, the account database comprising a first account record associated with the first trader which includes data reflecting funds maintained on account to cover trading losses by the first trader, and a second account record associated with the second trader which includes data reflecting funds maintained on account to cover trading losses by the second trader;

a payment processor coupled with the memory and operative to, periodically based on a first position in a first instrument held by the first trader to which the second trader is a counter party, determine the amount of a payment to be made from one of the first or second trader to the other of the first or second trader in advance of settlement thereof based on a percentage of a notional value of the first instrument, the first instrument having a fixed settlement value and a notional value which varies as a function of an inflation index; and wherein the payment processor is further operative to automatically assign the first trader a second position in a futures contract characterized by the settlement date, a quantity and a price, the second position being characterized by a value based on the quantity and the price of the futures contract as of the assignment, and automatically assign the second trader a third position, counter to the second position, in the futures contract, the first and second traders not being identified to each other, the payment processor being further operative to automatically assign the first and second positions to the first and second traders based on another position in another instrument held by the first trader to which the second trader is a counterparty;

a settlement processor coupled with the memory and operative to value, upon occurrence of the settlement date, the futures contract at a spot value different from the price of the futures contract, the spot value being based on the determined payment amount;

a margin processor coupled with the settlement processor and the memory and operative to modify the first and second account records in the account database to reflect a credit to the account of the first trader and a debit from the account of the second trader in the amount of the difference between the value of the second position and the spot value when the difference represents a loss for the second trader, and modify the first and second account records in the account database to reflect a debit from the account of the first trader and a credit to the account of the second trader in the amount of the difference between the value of the second position and the spot value when the difference represents a loss for the first trader; and wherein the first position and the periodic payment amounts are characterized by economic characteristics similar to economic characteristics of a Treasury Inflation Protected Security.

13. The system of claim 12 wherein the inflation index comprises the consumer price index.

14. The system of claim 12 further comprising:
when the account of the first trader is credited and the account of the second trader is debited:
the payment processor being further operative to determine the amount of an interest payment to be made from the first to the second trader in advance of settlement thereof based on the amount credited to the first trader, assign the first trader a fourth position in a futures contract characterized by a settlement date, a quantity and a price, the fourth position being characterized by a value based on the quantity and the price of the futures contract as of the assignment, and assign the second trader a fifth position, counter to the fourth position, in the futures contract, the first and second traders not being identified to each other;
the settlement processor being further operative to value, upon occurrence of the settlement date, the futures contract at a spot value different from the price of the futures contract, the spot value being based on the determined interest payment amount; and
the margin processor being further operative to modify the first and second account records in the account database to reflect a debit from the account of the first trader and a credit to the account of the second trader in the amount of the difference between the value of the second position and the spot value; and when the account of the first trader is debited and the account of the second trader is credited:
the payment processor being further operative to determine the amount of an interest payment to be made from the second to the first trader in advance of settlement thereof based on the amount credited to the first trader, assign the first trader a sixth position in a futures contract characterized by a settlement date, a quantity and a price, the sixth position being characterized by a value based on the quantity and the price of the futures contract as of the assignment, and assign the second trader a seventh position, counter to the sixth position, in the futures contract, the first and second traders not being identified to each other;
the settlement processor being further operative to value, upon occurrence of the settlement date, the futures contract at a spot value different from the price of the futures contract, the spot value being based on the determined interest payment amount; and
the margin processor being further operative to modify the first and second account records in the account database to reflect a credit to the account of the first trader and a debit from the account of the second trader in the amount of the difference between the value of the second position and the spot value.

15. The system of claim 12 wherein the quantity of futures contract is 1, the payment processor being further operative to assign the second and third positions in a plurality of the futures contract, the quantity of the plurality of the futures contract being determined based on the payment amount.

16. The system method of claim 12 wherein the value of the second and third positions as of the assignment is zero.

17. The system of claim 12 wherein the value of the second and third positions as of the assignment is non-zero.

18. The system of claim 12 wherein the payment processor is operative to determine the payment amount upon occurrence of the settlement date.

19. The system of claim 12 wherein the payment processor determines the payment amount one of quarterly, semiannually, or annually.

20. The system of claim 12 wherein the quantity of the futures contract is 1, the assigning of the second and third positions to the first and second traders respectively, further comprising assigning the second and third positions in a plurality of the futures contract, the quantity of the plurality of the futures contract being determined based on the payment amount.

21. The system of claim 12 wherein the spot value is valued based on a multiplier and a final settlement value.

22. The system of claim 12 wherein the first instrument comprises a futures contract.

23. A system for facilitating a payment between a first trader and a second trader by a central counterparty which requires the first and second traders to each maintain associated accounts in which funds are deposited to cover trading losses, the central counterparty comprising a processor and a memory coupled therewith, the system comprising:
an account database stored in the memory, the account database comprising a first account record associated with the first trader which includes data reflecting funds maintained on account to cover trading losses by the first trader, and a second account record associated with the second trader which includes data reflecting funds maintained on account to cover trading losses by the second trader;
first logic stored in the memory and executable by processor to determine, periodically based on a first position in a first instrument held by the first trader to which the second trader is a counterparty, the amount of a payment to be made from one of the first or second trader to the other of the first or second trader in advance of settlement thereof based on a percentage of a notional value of the first instrument, the first instrument having a fixed settlement value and a notional value which varies as a function of an inflation index;
the first logic being further executable to automatically assign the first trader a second position in a futures contract characterized by the settlement date, a quantity and a price, the second position being characterized by a value based on the quantity and the price of the futures contract as of the assignment, and automatically assign the second trader a third position, counter to the second position, in the futures contract, the first and second traders not being identified to each other, the first logic being further executable to automatically assign the first and second positions to the first and second traders based on another position in another instrument held by the first trader to which the second trader is a counterparty;
second logic stored in the memory and executable by the processor to value, upon occurrence of the settlement date, the futures contract at a spot value different from the price of the futures contract, the spot value being based on the determined payment amount;
third logic stored in the memory and executable by the processor to modify the first and second account records in the account database to reflect a credit to the account of the first trader and a debit from the account of the second trader in the amount of the difference between the value of the second position and the spot value when the difference represents a loss for the second trader, and modify the first and second account records in the account database to reflect a debit from the account of the first trader and a credit to the account of the second trader in the amount of the difference between the value of the second position and the spot value when the difference represents a loss for the first trader.

* * * * *